(12) United States Patent
Hollis

(10) Patent No.: US 10,523,473 B2
(45) Date of Patent: *Dec. 31, 2019

(54) CHARACTERIZATION OF DECISION FEEDBACK EQUALIZER TAPS

(71) Applicant: Micron Technology, Inc., Boise, ID (US)

(72) Inventor: Timothy Mowry Hollis, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/201,671

(22) Filed: Nov. 27, 2018

(65) Prior Publication Data

US 2019/0116070 A1  Apr. 18, 2019

Related U.S. Application Data

(63) Continuation of application No. 15/689,721, filed on Aug. 29, 2017, now Pat. No. 10,164,805.

(51) Int. Cl.
*H04B 3/30* (2006.01)
*H04L 25/03* (2006.01)

(52) U.S. Cl.
CPC .......... *H04L 25/03057* (2013.01); *H04B 3/30* (2013.01)

(58) Field of Classification Search
USPC ....................................... 375/340, 233, 229
See application file for complete search history.

(56) References Cited

U.S. PATENT DOCUMENTS

| | | | |
|---|---|---|---|
| 6,526,093 B1 | 2/2003 | Bao et al. | |
| 9,531,569 B2 | 12/2016 | Berke et al. | |
| 10,164,805 B1* | 12/2018 | Hollis | ............... H04L 25/03057 |
| 2007/0253475 A1* | 11/2007 | Palmer | .................... H04L 7/041 |
| | | | 375/229 |
| 2008/0212718 A1* | 9/2008 | Lytollis | .................. H03G 3/002 |
| | | | 375/340 |
| 2012/0057627 A1 | 3/2012 | Chan et al. | |
| 2013/0322555 A1 | 12/2013 | Yousefi et al. | |
| 2014/0169426 A1 | 6/2014 | Aziz et al. | |
| 2014/0355658 A1 | 12/2014 | Meier et al. | |
| 2015/0010047 A1* | 1/2015 | Zhong | ............... H04L 25/03057 |
| | | | 375/233 |
| 2015/0180646 A1* | 6/2015 | Zerbe | ................ H04L 25/03038 |
| | | | 375/233 |
| 2016/0006589 A1 | 1/2016 | Kamali | |
| 2016/0028562 A1 | 1/2016 | Dallaire et al. | |
| 2016/0301548 A1 | 10/2016 | Musah et al. | |

* cited by examiner

*Primary Examiner* — Eva Y Puente
(74) *Attorney, Agent, or Firm* — Schwegman Lundberg & Woessner, P.A.

(57) ABSTRACT

Various embodiments, disclosed herein, can include apparatus and methods to characterize taps of a decision feedback equalizer of a data receiver. In characterizing the taps of the decision feedback equalizer of the data receiver, a signal can be transmitted to the data receiver and the received data can be iteratively sampled at an output of the decision feedback equalizer. The sampling can include stepping a sample time relative to arrival of the received data and stepping a reference voltage level to which the received data is compared. Values of the sampled data can be compared with known correct values and such measurements can be used to characterize the taps. Additional apparatus, systems, and methods are disclosed.

20 Claims, 32 Drawing Sheets

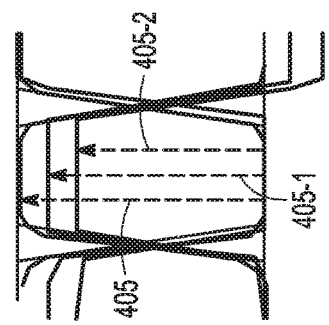
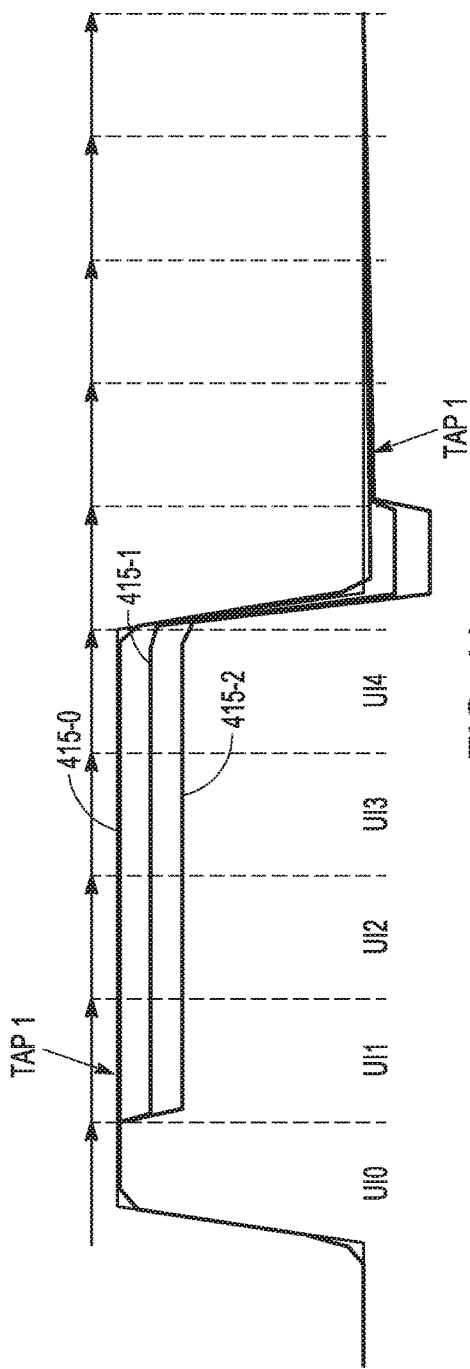
FIG. 4B
FIG. 4A

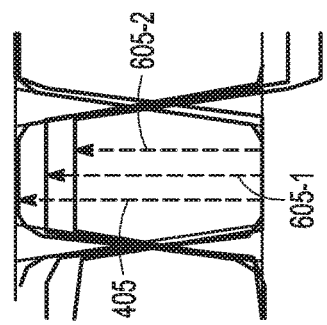
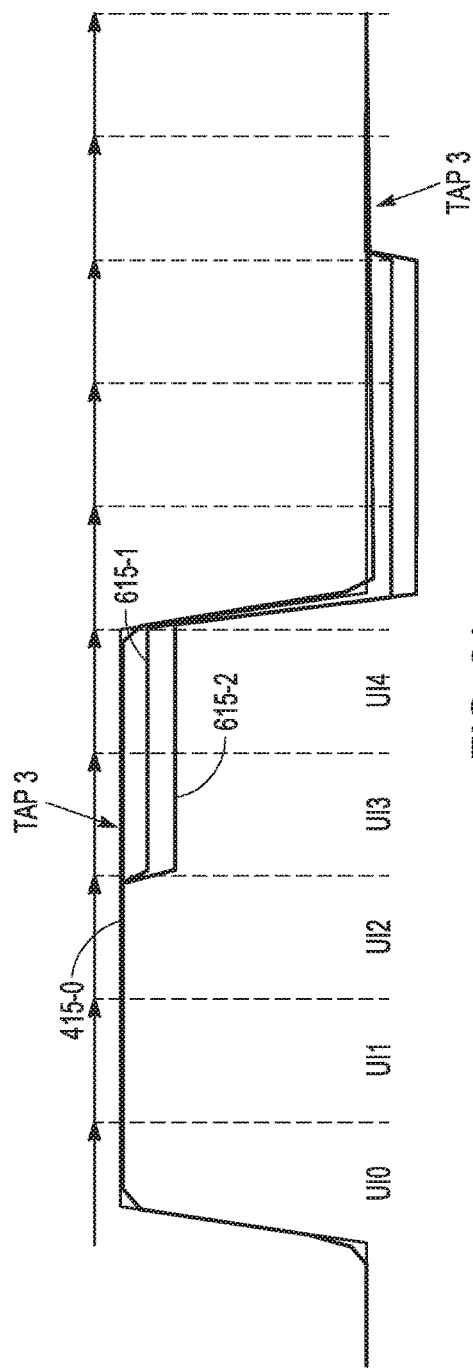
FIG. 6B
FIG. 6A

CHARACTERIZATION OF DECISION FEEDBACK EQUALIZER TAPS

PRIORITY APPLICATION

This application is a continuation of U.S. application Ser. No. 15/689,721, filed Aug. 29, 2017, which is incorporated herein by reference in its entirety.

BACKGROUND

With addition of decision feedback equalization to memory devices, such as but not limited to double data rate fourth-generation dynamic random-access memory (DDR4) and double data rate fifth-generation dynamic random-access memory (DDR5), as well as other future products, efficient ways to characterize the decision feedback equalization circuitry integrated into these devices would enhance the applicability of these devices. A decision feedback equalizer (DFE) can include taps that tap the output signal of the DFE and provide feedback to the input such that a weighted sum of the tapped signals can be subtracted from the input signal. Tap can refer to a weighted signal fed back, where the weight can also be referred to as tap coefficient.

Typically, testing of a DFE can be performed by optimizing its taps to zero out inter-symbol interference (ISI) in a golden channel. A golden channel is a transmission channel created with known amounts of degradation. The golden channel can be used to predict which DFE settings can be implemented to cancel out that degradation, where demonstrating that the degradation can be cancelled shows that the DFE is working. This process, using a golden channel, would indicate DFE functionality, but it would not be sufficient to highlight characteristics of the taps of the DFE tested.

BRIEF DESCRIPTION OF THE DRAWINGS

FIGS. 4A-4B illustrate an example process of characterizing tap one of a four tap decision feedback equalizer, according to various embodiments.

FIGS. 6A-6B illustrate an example process of characterizing tap three of the four tap decision feedback equalizer associated with FIGS. 4A and 4B, according to various embodiments.

DETAILED DESCRIPTION

The following detailed description refers to the accompanying drawings that show, by way of illustration, various embodiments of the invention. These embodiments are described in sufficient detail to enable those of ordinary skill in the art to practice these and other embodiments. Other embodiments may be utilized, and structural, logical, mechanical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

Figure 1:
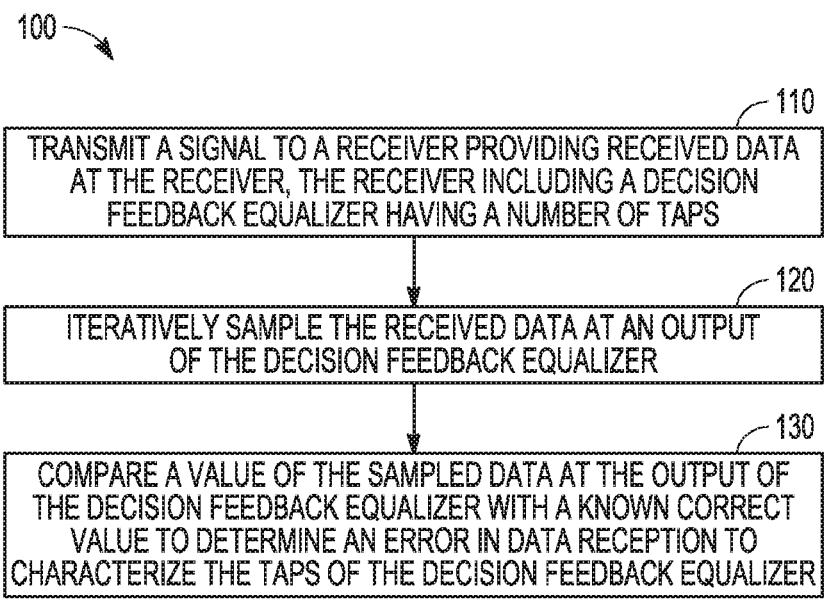
FIG. 1 is a flow diagram of features of an example method of characterizing taps of a decision feedback equalizer, according to various embodiments.

FIG. 1 is a flow diagram of features of an embodiment of an example method 100 of characterizing taps of a decision feedback equalizer. At 110, a signal is transmitted to a receiver providing received data at the receiver, where the receiver includes a decision feedback equalizer having a number of taps. The signal can be provided as a digital pattern of high values followed by a low value after a number of bit periods, the number being at least one more than the number of taps of the decision feedback equalizer.

At 120, the received data is iteratively sampled at an output of the decision feedback equalizer. Iteratively sampling the received data can include stepping a sample time relative to arrival of the received data and stepping a reference voltage level to which the received data is compared. Stepping the sample time relative to arrival of the received data and stepping the reference voltage level can be conducted in an intersymbol interference-free environment. Sampling the received data can include sampling the received data at a slower speed than a data rate associated with the receiver.

At 130, a value of the sampled data at the output of the decision feedback equalizer is compared with a known correct value to determine an error in data reception to characterize the taps of the decision feedback equalizer. If iteratively sampling the received data includes stepping a sample time relative to the arrival of the received data and stepping a reference voltage level to which the received data is compared, a measured number of error free sample time steps and reference voltage steps can be used to characterize the taps of the decision feedback equalizer.

Figure 2B:
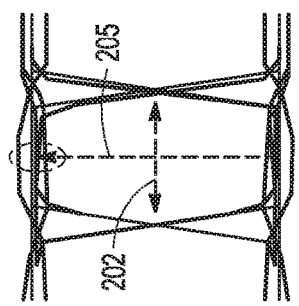
FIG. 2B illustrates inter-symbol interference from each unit interval of FIG. 2A in an eye diagram, according to various embodiments.
Figure 2A:
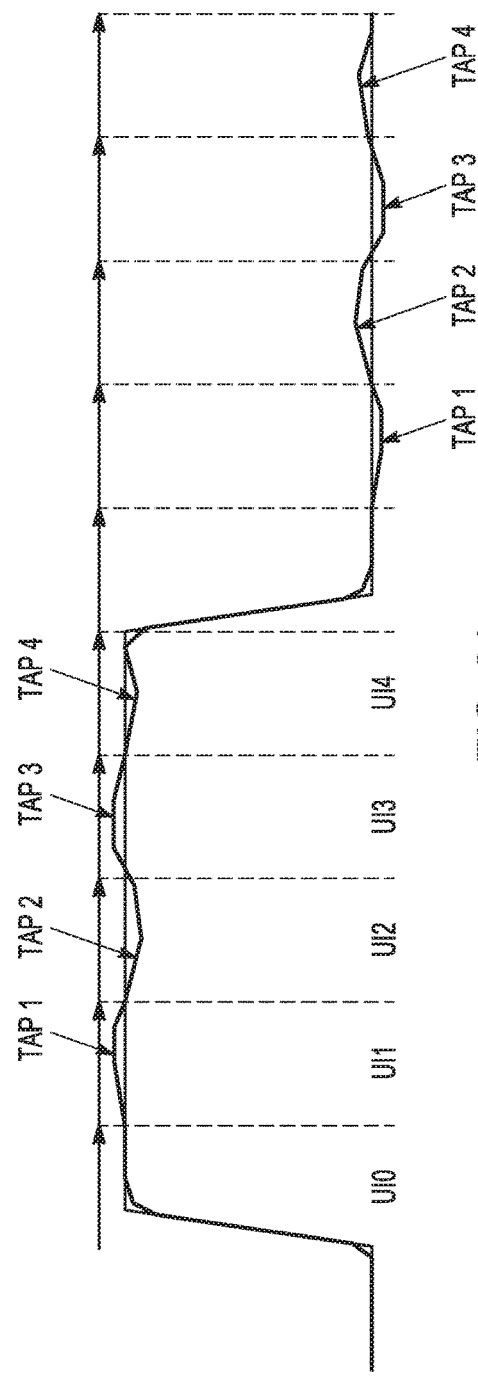
FIG. 2A illustrates a voltage step for a decision feedback equalizer driven high for a number of unit intervals, according to various embodiments.

FIG. 2A illustrates a voltage step for a DFE driven high for a number of unit intervals (UIs). A unit interval is a width of an eye opening of an eye diagram of a waveform and corresponds to one bit period of the waveform. A data eye diagram is an example of a measurement mechanism that may be implemented to represent and analyze a high speed digital signal. A data eye diagram can be constructed from a digital waveform corresponding to each individual bit into a single graph with signal amplitude on the vertical axis and time on horizontal axis. By repeating this construction over many samples of the waveform, the resultant graph represents the average statistics of the signal and resembles an eye having an eye opening.

When driving the voltage step, the variation in the signal around the expected steady state constitutes ISI. FIG. 2B illustrates ISI from each UI in an eye diagram having an eye height 205 and width 202. A DFE can be implemented to address ISI in a data receiver. ISI during UI1 can be addressed by DFE tap 1 forced to steady state. In general, ISI during UIx, $1 \le x \le N$, x being an integer and N being the number of taps of the DFE, can be addressed by DFE tap x forced to steady state. The example shown in FIG. 2A has four taps. By zeroing out the ISI, the functionality of the DFE can be tested, as the eye height should improve until the optimal coefficients are found. As noted, this would not distinguish easily between the behavior of each tap, and the full range of tap tuning would likely not be exercised.

In various embodiments, eye heights in eye diagrams from a DFE of a data receiver can be measured versus over-equalization in an ISI-free environment. Eye closure should be a direct measure of tap magnitude. In the tester environment, there is typically no LSI to consider, that is, the tester environment is a very clean and controlled environment. However, because ISI is a function of channel bandwidth, it is possible to reduce the influence of ISI in the measurements, as taught herein, simply by slowing down the procedure. While this doesn't necessarily improve confidence in the circuits "at speed," it still provides a mechanism that supports the tasks of evaluating DFE tap step size, range and step linearity. In the test environment that is clean and controlled, one can actually over equalize the DFE. In other words, the signal to the DFE can be degraded with the equalization, which will be a measure of how much equalization is being applied. So, whereas normally the equalization of the DFE compensates for degradation, there is no degradation in this testing environment when the DFE is turned on and degradation is actually introduced. By measuring the amount of introduced degradation, the behavior of the DFE can be characterized. This characterization can include tap step size of each tap, the linearity of the steps of each tap, and the range of each tap.

Figure 3A:
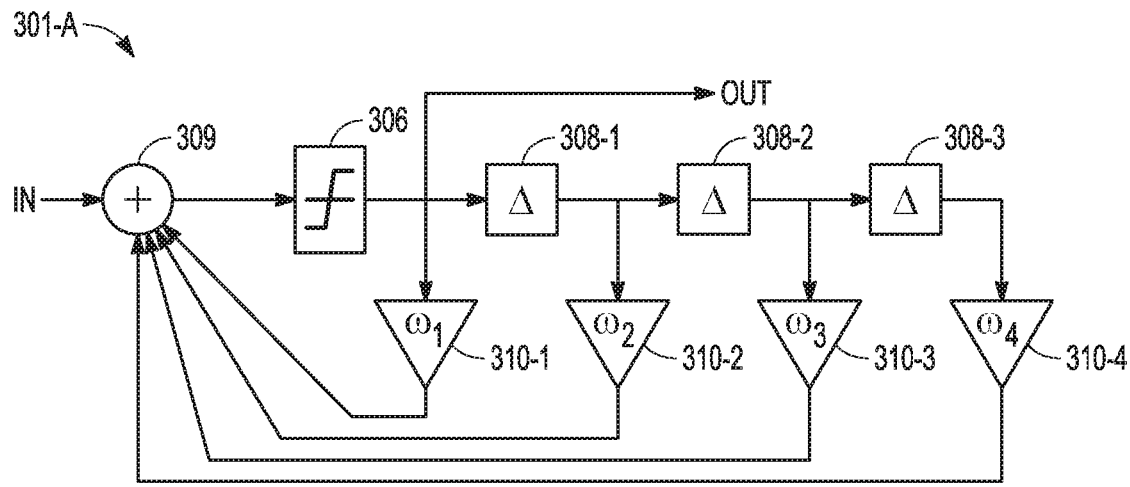
FIG. 3A is a block diagram of an example decision feedback equalizer having four taps, according to various embodiments.

FIG. 3A is a block diagram of a DFE 301-A having four taps 310-1, 310-2, 310-3, and 310-4. DFE 301-A can include a comparator 306, which may be realized as a comparator that makes a decision against a reference voltage. The output (Out) of comparator 306 is a digital value that is the output of DFE 301-A. Copies of the output are generated in which each copy from is delayed from another copy by a cycle, where there is a delay 308-1 between tap 310-1 and tap 310-2, a delay 308-2 between tap 310-2 and tap 310-3, and a delay 308-3 between tap 310-3 and tap 310-4. Signals from taps 310-1, 310-2, 310-3, and 310-4 with weights $\omega_1$, $\omega_2$, $\omega_3$, and $\omega_4$, respectively, from at the output of DFE 301-A are subtracted from the input (in) at summer 309, which may be referred as subtractor 309, in order to subtract out ISI in the input signal. Taps 310-1, 310-2, 310-3, and 310-4 include amplifiers whose amplification is correlated to weights $\omega_1$, $\omega_2$, $\omega_3$, and $\omega_4$, respectively. As seen in FIG. 3A, in operation of DFE 201-A, signals are tapped off from the output, delayed, weighted and subtracted from the input.

Figure 3B:
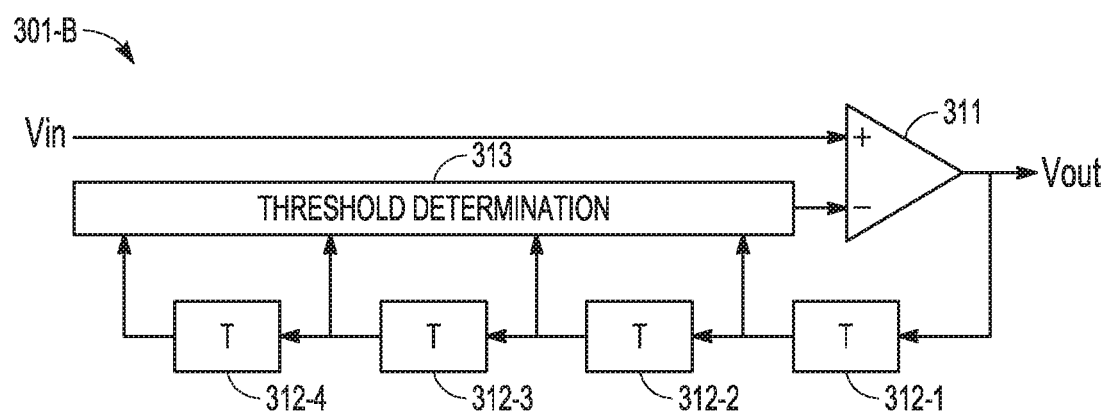
FIG. 3B is a block diagram of an example decision feedback equalizer implemented with a comparator circuit that adjusts its detection threshold based on past decisions, according to various embodiments.

FIG. 3B is a block diagram of a DFE 301-B implemented with a comparator circuit 311 that adjusts its detection threshold based on past decisions. DFE includes taps 312-1, 312-2, 312-3 and 312-4 that provides input to a threshold determination 313 based on the output voltage, Vout, from comparator circuit 311. The output of threshold determination 313 is coupled to comparator circuit 311 to adjust the input voltage, Vin, with the adjusted voltage becoming Vout compensated for ISI.

FIGS. 4A and 4B illustrate an embodiment of an example process of characterizing tap 1 of a four tap DFE. A digital pattern can be sent to the decision feedback equalizer, where the digital pattern maintains a high for a number of consecutive unit intervals greater than the number of taps and then low at least one unit interval longer than the number of taps. For a four tap DFE, a data pattern of 1111100000 can be input to the DFE. This data pattern may be sent at ⅕ data rate of the operational DFE. The pattern can remain high and then remain low at least 1 UI longer than the number of taps. To provide increased flexibility, the pattern can last just one UI beyond the number of the tap to be characterized. Choosing a pattern that holds its state 1 UI longer than the total number of taps, as described above, allows for the same pattern to be applied while characterizing each tap, but it is not strictly necessary. For tap 1, for example, one could use an 1100 pattern; for tap 2 an 111000 pattern, and so on. Changing the pattern based on the specific tap under test increases the complexity of the testing algorithm, but could be used to reduce the total test time. With the DFE disabled and using the data pattern, a baseline eye height 405, shown in FIG. 4B, can be measured associated with voltage step 415-0. By the DFE disabled, it is meant that no feedback signal is subtracted from the signal at the input. This can be accomplished in a number of ways. A switch may be used to disconnect the feedback of the taps. In another approach, the tap weights of all the taps can be set to zero.

Tap 1 can be enabled with a first value with the other taps disabled. Enabling tap 1 may include either sweeping it or setting it to an expected value. The eye height can be re-measured, providing eye height 405-1 for tap 1 at the first value associated with voltage step 415-1. The value of tap 1 can be changed to a second value with the other taps disabled. The eye height can be re-measured, providing eye height 405-2 for tap 1 at the second value associated with voltage step 415-2. The value of tap 1 can be changed iteratively and the eye height re-measured until the eye height reaches zero or no longer changes, the latter indicating that the extremes of the tap range have been reached. The different values of tap 1 can be different steps of tap 1.

These measurements with respect to tap 1 can be used to characterize tap 1. The difference between the baseline eye height and the measured eye heights for the different values of tap 1 (Δ eye heights with respect to baseline for tap 1) provide a direct measure of the impact of tap 1. The difference between the eye height with tap 1 at one value and the eye height from a previous step, for example Δ eye height between adjacent steps in an ordering of the values of the steps of tap 1, provides a direct measure of a step size of these two values of tap 1. For all values of tap 1 for which eye heights are measured, Δ eye height between adjacent steps yields a set of step sizes. From the set of step sizes for tap 1, linearity of tap 1 can be assessed. The value of tap 1 at which the eye height zeros out or approaches zero within a selected range of zero provides a measurement of the range of tap 1, as mentioned.

Figure 5B:
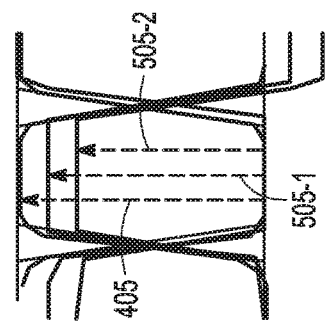
FIGS. 5A-5B illustrate an example process of characterizing tap two of the four tap decision feedback equalizer associated with FIGS. 4A and 4B, according to various embodiments.
Figure 5A:
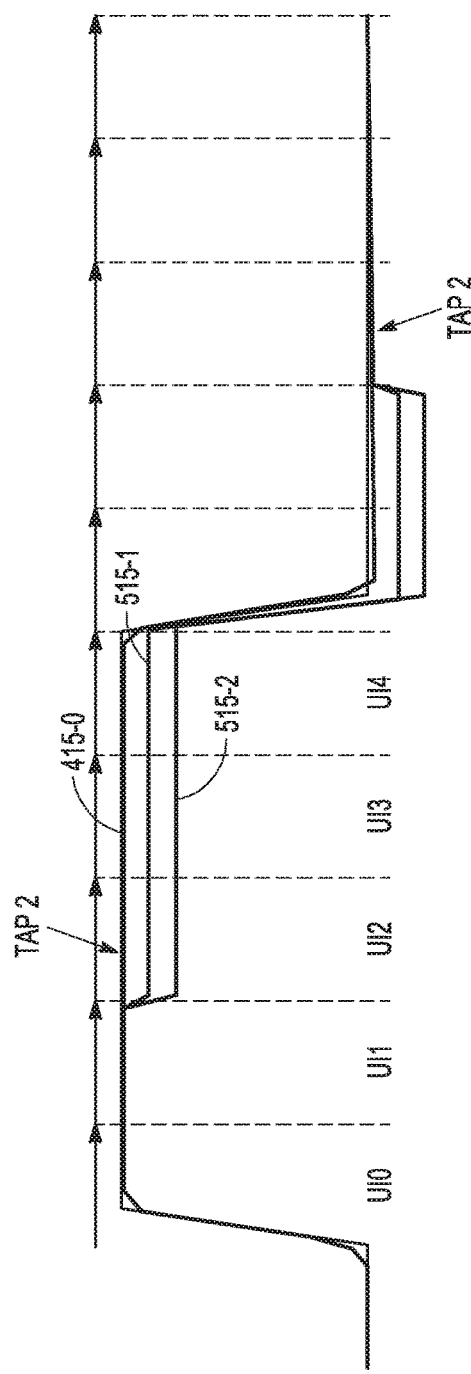

FIGS. 5A and 5B illustrate an embodiment of an example process of characterizing tap 2 of the four tap DFE associated with FIGS. 4A and 4B. With a baseline eye height 405 measured and associated with voltage step 415-0, as shown in FIGS. 4A and 4B, tap 2 can be enabled with a first value with the other taps disabled and an eye height measured again using the data pattern of 1111100000. Enabling tap 2 may include either sweeping it or setting it to an expected value. The eye height can be re-measured, providing eye height 505-1 for tap 2 at the first value associated with voltage step 515-1. The value of tap 2 can be changed to a second value with the other taps disabled. The eye height can be re-measured, providing eye height 505-2 for tap 2 at the second value associated with voltage step 515-2. The value of tap 2 can be changed iteratively and the eye height re-measured until the eye height reaches zero or no longer changes. The different values of tap 2 can be different steps of tap 2.

These measurements with respect to tap 2 can be used to characterize tap 2. The difference between the baseline eye height and the measured eye heights for the different values of tap 2 (Δ eye heights with respect to baseline for tap 2) provide a direct measure of the impact of tap 2. The difference between the eye height with tap 2 at one value and the eye height from a previous step (Δ eye height between adjacent steps in an ordering of the values of the steps of tap 2) provides a direct measure of a step size of these two values of tap 2. For all values of tap 2 for which eye heights are measured, Δ eye height between adjacent steps of tap 2 yields a set of step sizes. From the set of step sizes for tap 2, linearity of tap 2 can be assessed. The value of tap 2 at which the eye height zeros out or approaches zero within a selected range of zero provides a measurement of the range of tap 2.

FIGS. 6A and 6B illustrate an embodiment of an example process of characterizing tap 3 of the four tap DFE associated with FIGS. 4A and 4B. With a baseline eye height 405 measured and associated with voltage step 415-0, as shown in FIGS. 4A and 4B, tap 3 can be enabled with a first value with the other taps disabled and an eye height measured again using the data pattern of 1111100000. Enabling tap 3 may include either sweeping it or setting it to an expected value. The eye height can be re-measured, providing eye height 605-1 for tap 3 at the first value associated with voltage step 615-1. The value of tap 3 can be changed to a second value with the other taps disabled. The eye height can be re-measured, providing eye height 605-2 for tap 3 at the second value associated with voltage step 615-2. The value of tap 3 can be changed iteratively and the eye height re-measured until the eye height is approximately zero. The different values of tap 3 can be different steps of tap 3.

These measurements with respect to tap 3 can be used to characterize tap 3. The difference between the baseline eye height and the measured eye heights for the different values of tap 3 (Δ eye heights with respect to baseline for tap 3) provide a direct measure of the impact of tap 3. The difference between the eye height with tap 3 at one value and the eye height from a previous step (Δ eye height between adjacent steps in an ordering of the values of the steps of tap 3) provides a direct measure of a step size of these two values of tap 3. For all values of tap 3 for which eye heights are measured, Δ eye height between adjacent steps of tap 3 yields a set of step sizes. From the set of step sizes for tap 3, linearity of tap 3 can be assessed. The value of tap 3 at which the eye height zeros out or approaches zero within a selected range of zero provides a measurement of the range of tap 3.

Figure 7B:
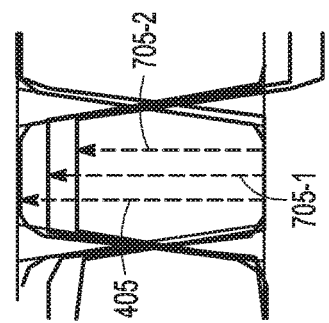
FIGS. 7A-7B illustrate an example process of characterizing tap four of the four tap decision feedback equalizer associated with FIGS. 4A and 4B, according to various embodiments.
Figure 7A:
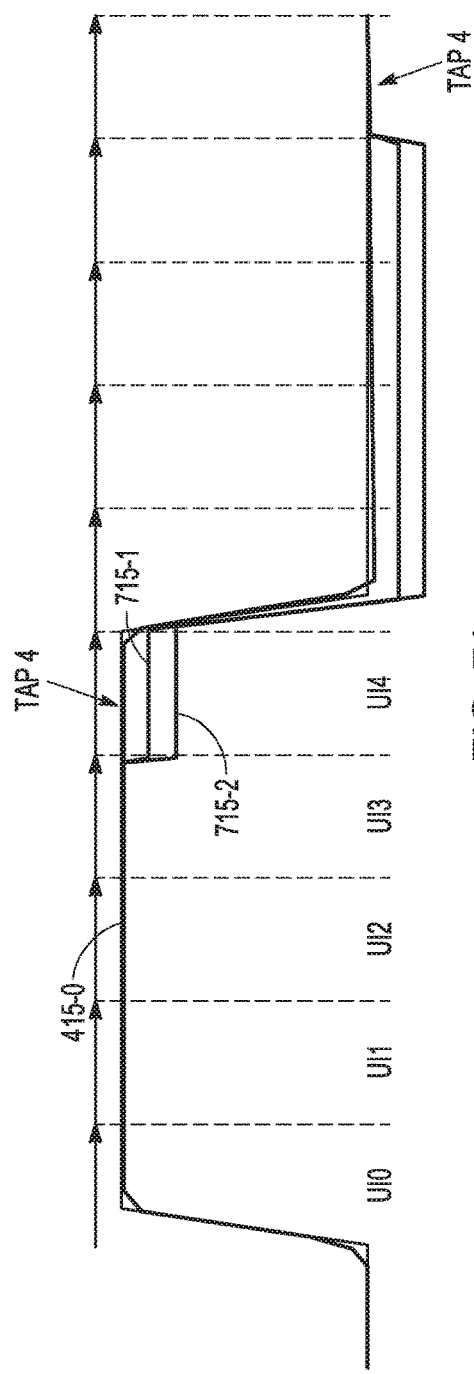

FIGS. 7A and 7B illustrate an embodiment of an example process of characterizing tap 4 of the four tap DFE associated with FIGS. 4A and 4B. With a baseline eye height 405 measured and associated with voltage step 415-0, as shown in FIGS. 4A and 4B, tap 4 can be enabled with a first value with the other taps disabled and an eye height measured again using the data pattern of 1111100000. Enabling tap 4 may include either sweeping it or setting it to an expected value. The eye height can be re-measured, providing eye height 705-1 for tap 4 at the first value associated with voltage step 715-1. The value of tap 4 can be changed to a second value with the other taps disabled. The eye height can be re-measured, providing eye height 705-2 for tap 4 at the second value associated with voltage step 715-2. The value of tap 4 can be changed iteratively and the eye height re-measured until the eye height is approximately zero. The different values of tap 4 can be different steps of tap 4.

These measurements with respect to tap 4 can be used to characterize tap 4. The difference between the baseline eye height and the measured eye heights for the different values of tap 4 (Δ eye heights with respect to baseline for tap 4) provide a direct measure of the impact of tap 4. The difference between the eye height with tap 4 at one value and the eye height from a previous step (Δ eye height between adjacent steps in an ordering of the values of the steps of tap 4) provides a direct measure of a step size of these two values of tap 4. For all values of tap 4 for which eye heights are measured, Δ eye height between adjacent steps of tap 4 yields a set of step sizes. From the set of step sizes for tap 4, linearity of tap 4 can be assessed. The value of tap 4 at which the eye height zeros out or approaches zero within a selected range of zero provides a measurement of the range of tap 4.

Figure 8A:
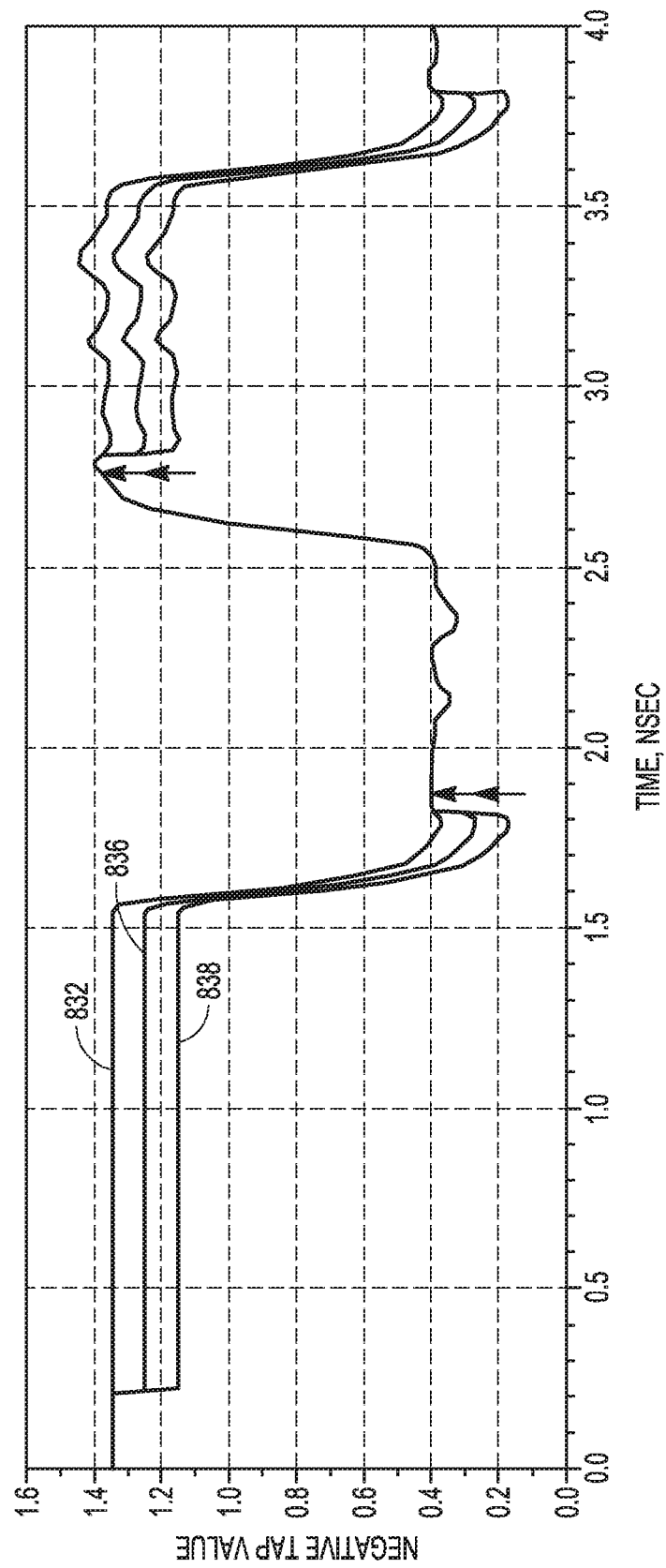
FIGS. 8A-8D illustrate a simulation of tap one of a four tap DFE of a data receiver for a negative tap value, according to various embodiments.
Figure 8D:
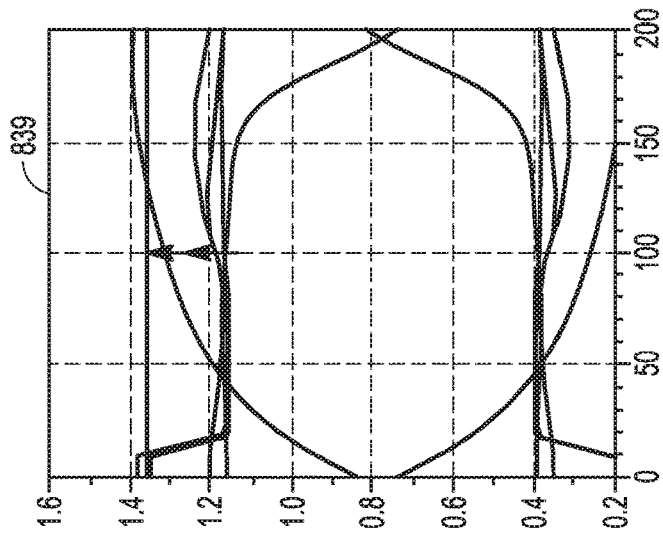
Figure 8C:
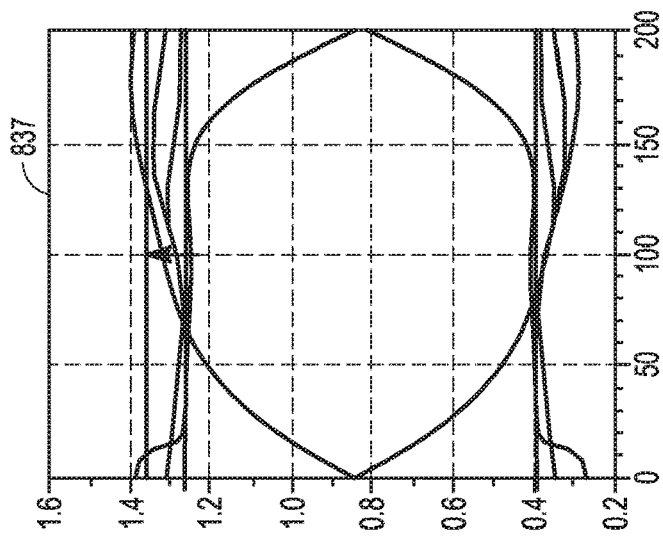
Figure 8B:
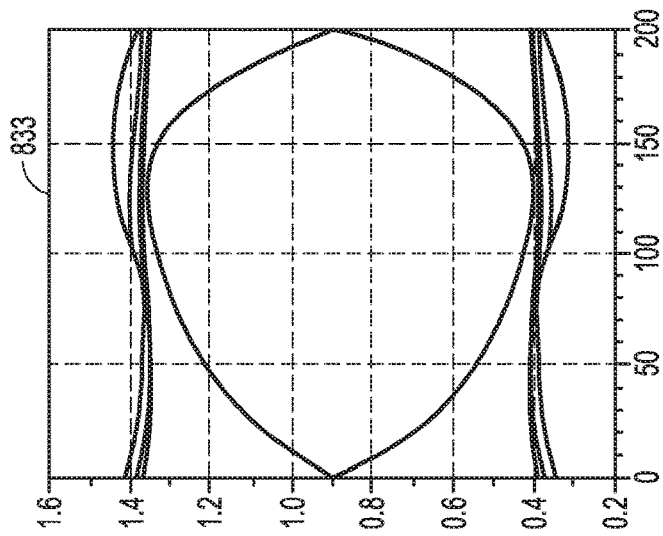

FIGS. 8A-8D illustrates a simulation of tap 1 of a four tap DFE of a data receiver for a negative tap value. Curves 832, 836, and 838 of FIG. 8A are curves for a reference value, a first step value of tap 1, and a second step value of tap 1, respectively. Eye diagram 833 of FIG. 8B corresponds to the reference value, eye diagram 837 of FIG. 8C corresponds to the first step value of tap 1, and eye diagram 839 of FIG. 8D corresponds to the second step value of tap 1.

Figure 9A:
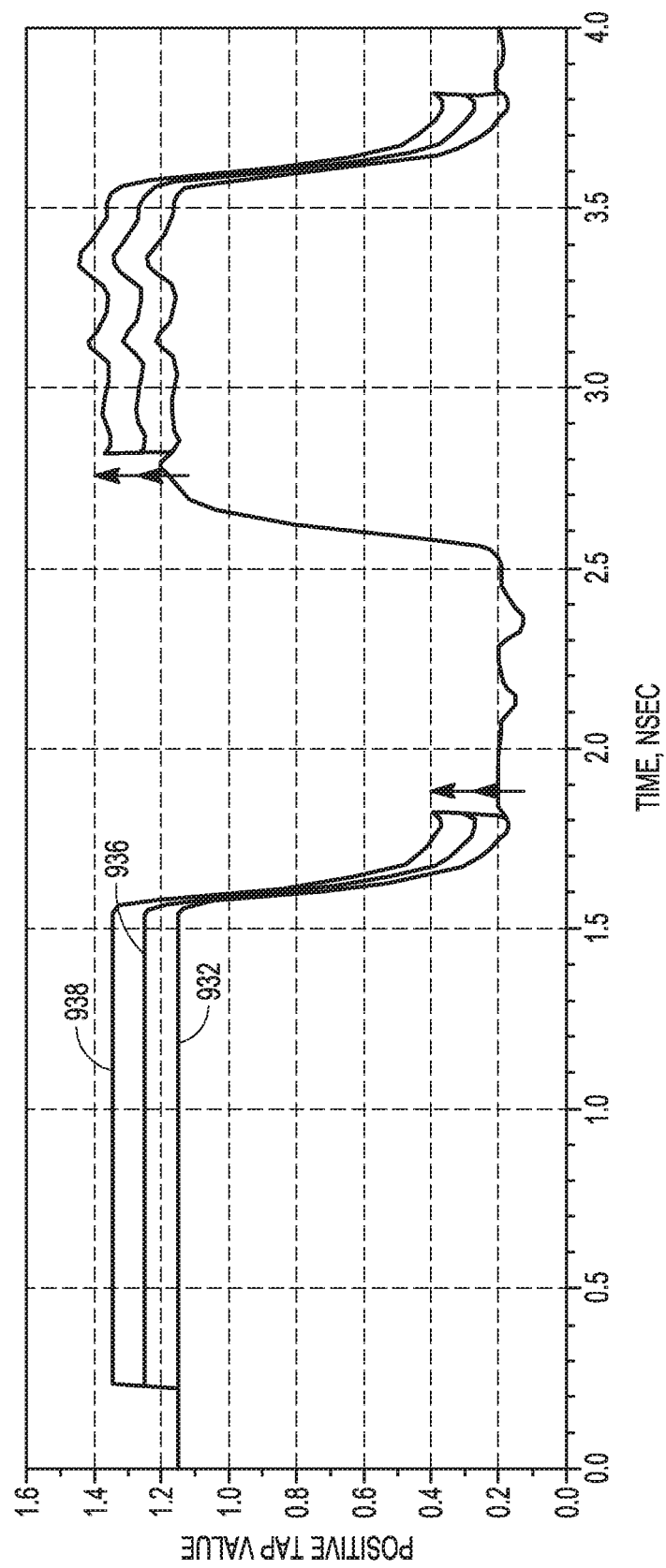
FIGS. 9A-9D illustrate a simulation of tap one of the four tap decision feedback equalizer of the data receiver associated with FIG. 8A for positive tap values, according to various embodiments.
Figure 9D:
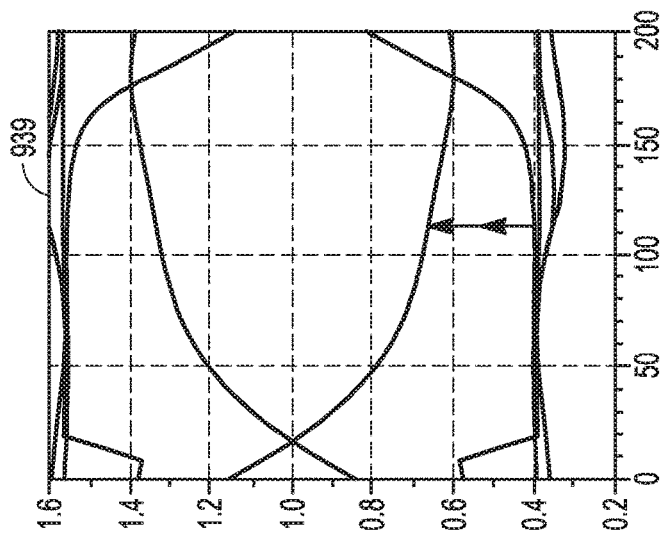
Figure 9C:
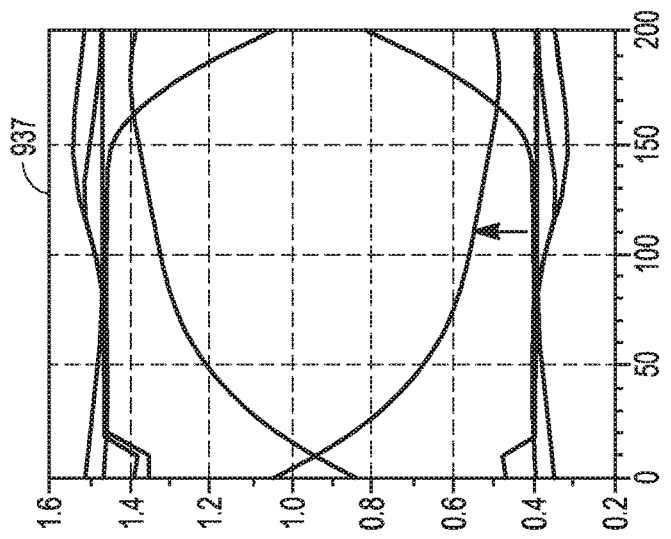
Figure 9B:
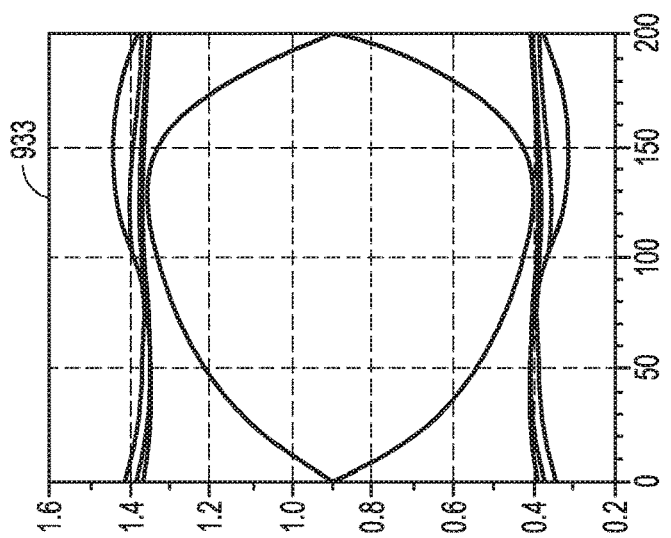

FIGS. 9A-9D illustrate a simulation of tap 1 of the four tap DFE of the data receiver associated with FIG. 8A for positive tap values. Curves 932, 936, and 938 of FIG. 9A are curves for a reference value, a first step value of tap 1, and a second step value of tap 1, respectively. Eye diagram 933 of FIG. 9B corresponds to the reference value, eye diagram 937 of FIG. 9C corresponds to the first step value of tap 1, and eye diagram 933 of FIG. 9D corresponds to the second step value of tap 1.

Figure 10A:
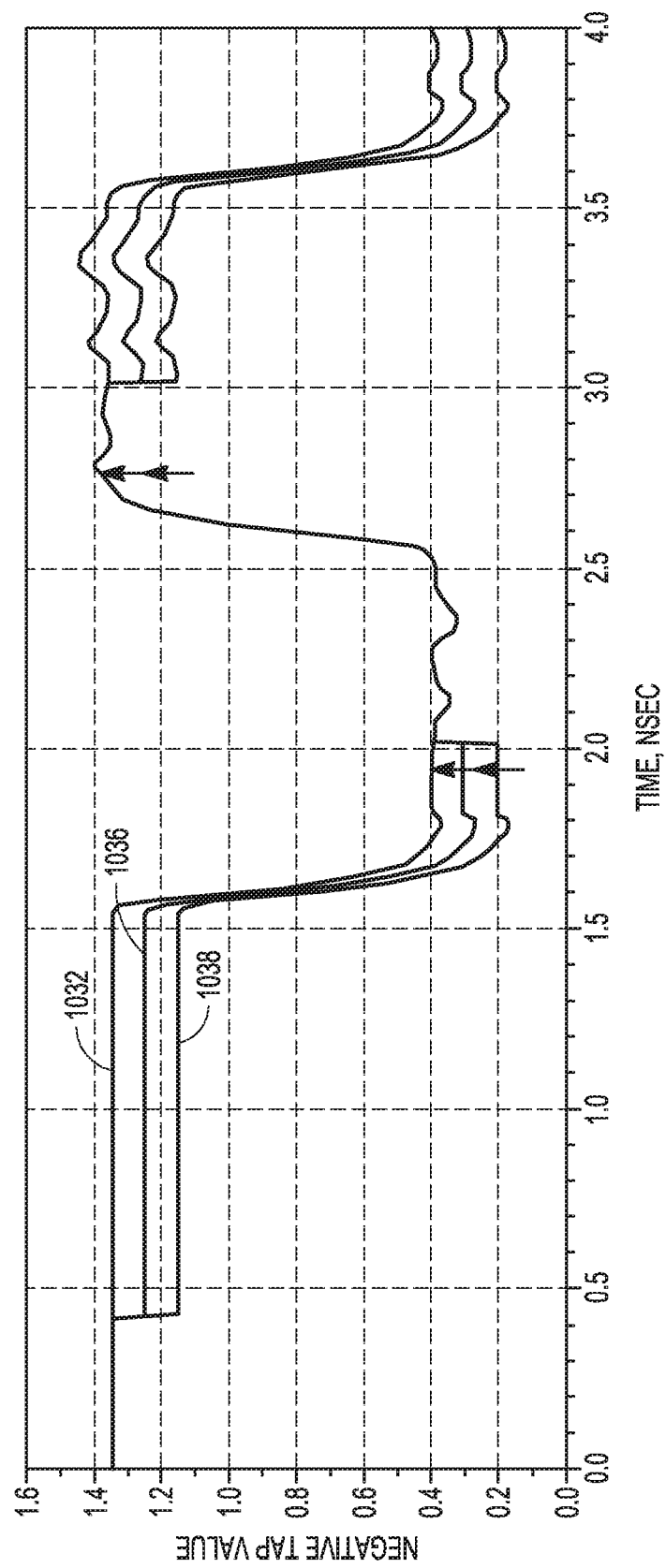
FIGS. 10A-10D illustrate a simulation of tap two of the four tap decision feedback equalizer of the data receiver associated with FIG. 8A for a negative tap value, according to various embodiments.
Figure 10D:
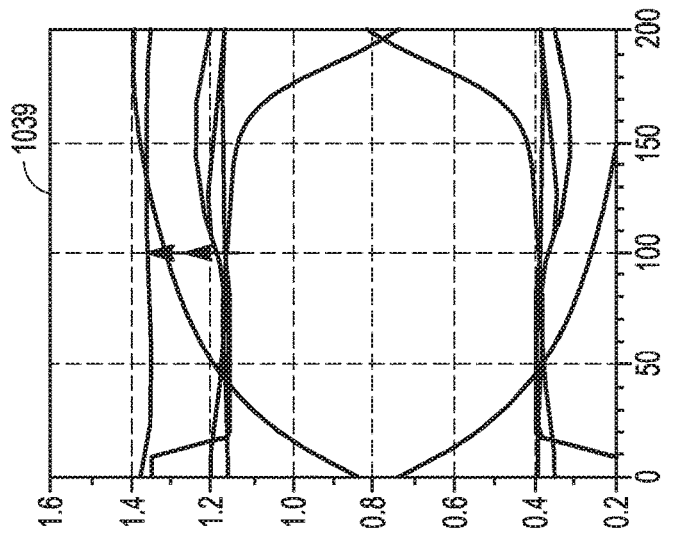
Figure 10C:
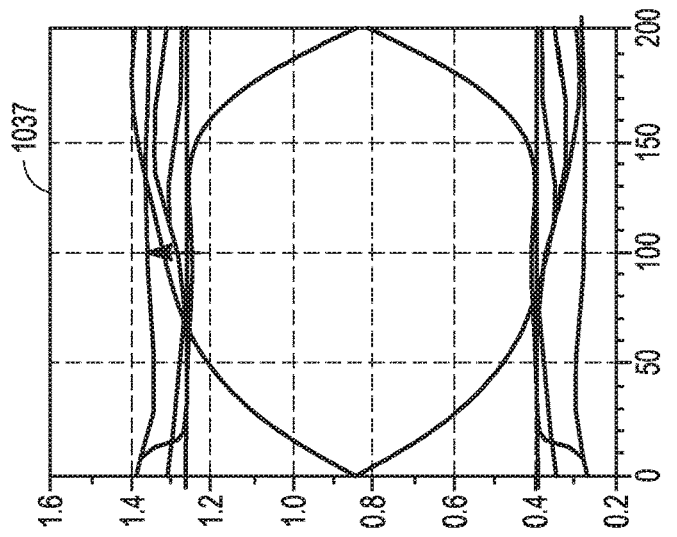
Figure 10B:
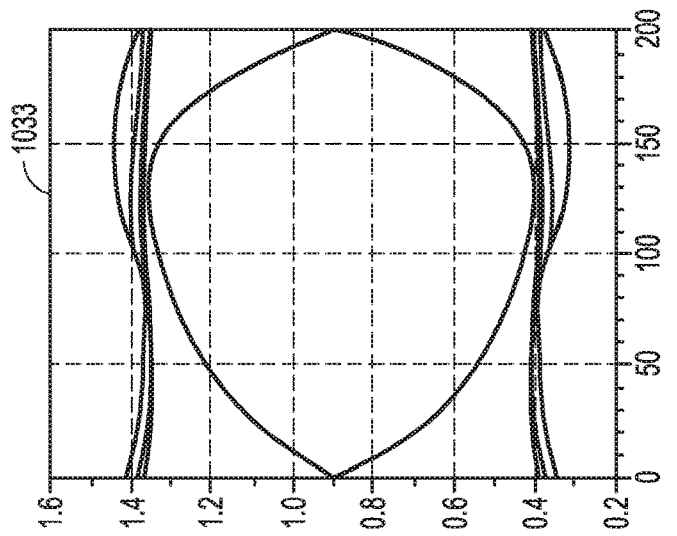

FIGS. 10A-10D illustrate a simulation of tap 2 of the four tap DFE of the data receiver associated with FIG. 8A for a negative tap value. Curves 1032, 1036, and 1038 of FIG. 10A are curves for a reference value, a first step value of tap 2, and a second step value of tap 2, respectively. Eye diagram 1033 of FIG. 10B corresponds to the reference value, eye diagram 1037 of FIG. 10C corresponds to the first step value of tap 2, and eye diagram 1039 of FIG. 10D corresponds to the second step value of tap 2.

Figure 11A:
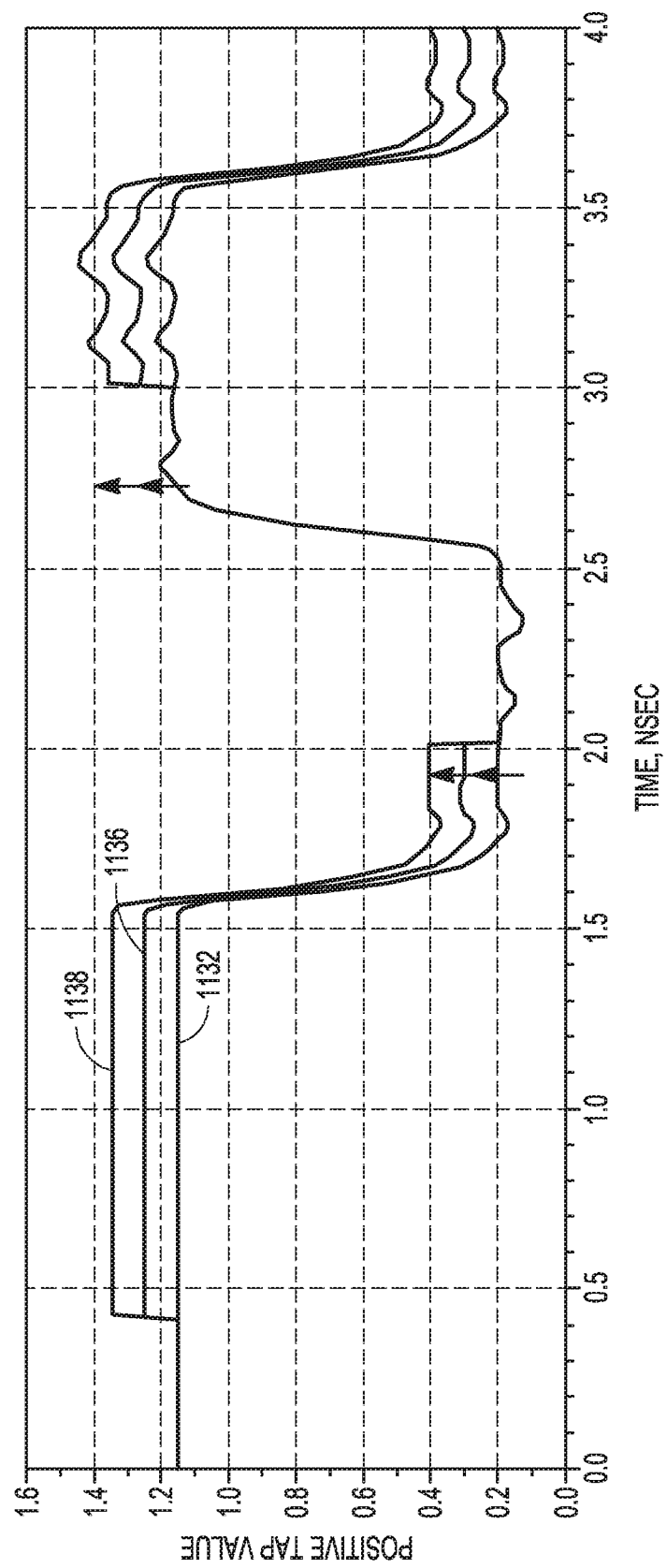
FIGS. 11A-11D illustrate a simulation of tap two of the four tap decision feedback equalizer of the data receiver associated with FIG. 8A for positive tap values, according to various embodiments.
Figure 11D:
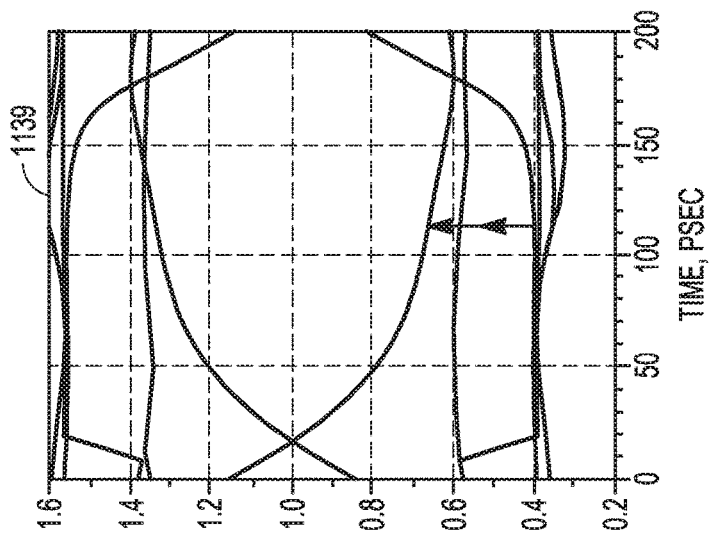
Figure 11C:
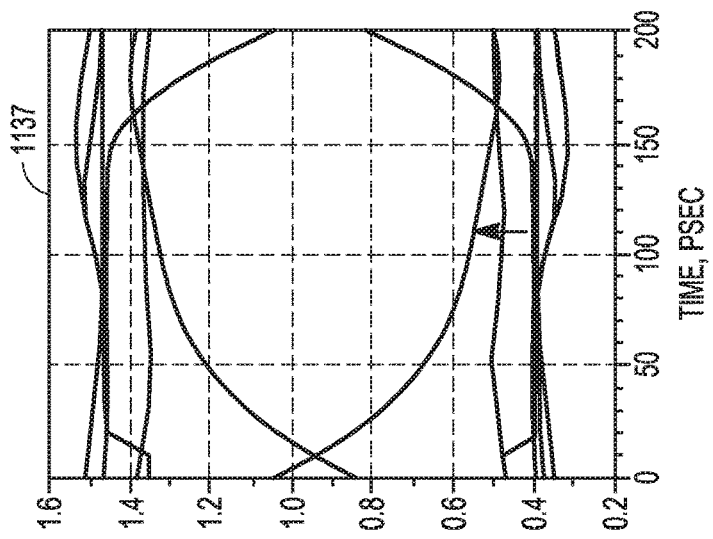
Figure 11B:
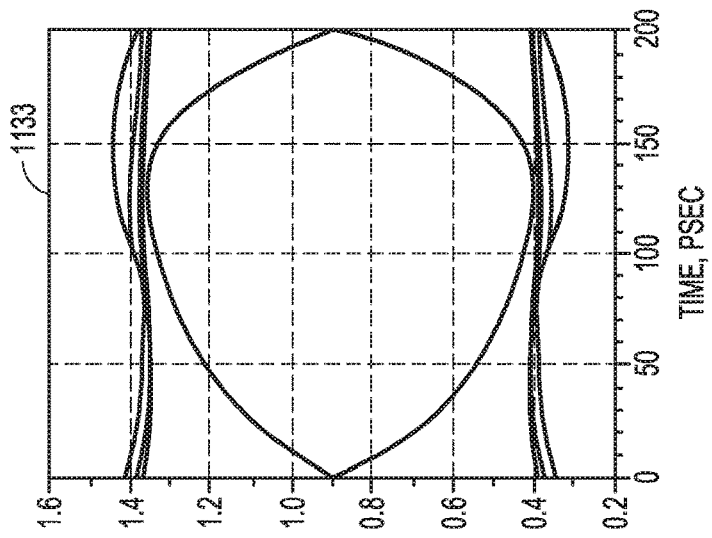

FIGS. 11A-11D illustrate a simulation of tap 2 of the four tap DFE of the data receiver associated with FIG. 8A for positive tap values. Curves 1132, 1136, and 1138 of FIG. 11A are curves for a reference value, a first step value of tap 2, and a second step value of tap 2, respectively. Eye diagram 1133 of FIG. 11B corresponds to the reference value, eye diagram 1137 of FIG. 11C corresponds to the first step value of tap 1, and eye diagram 1133 of FIG. 11D corresponds to the second step value of tap 2.

Figure 12A:
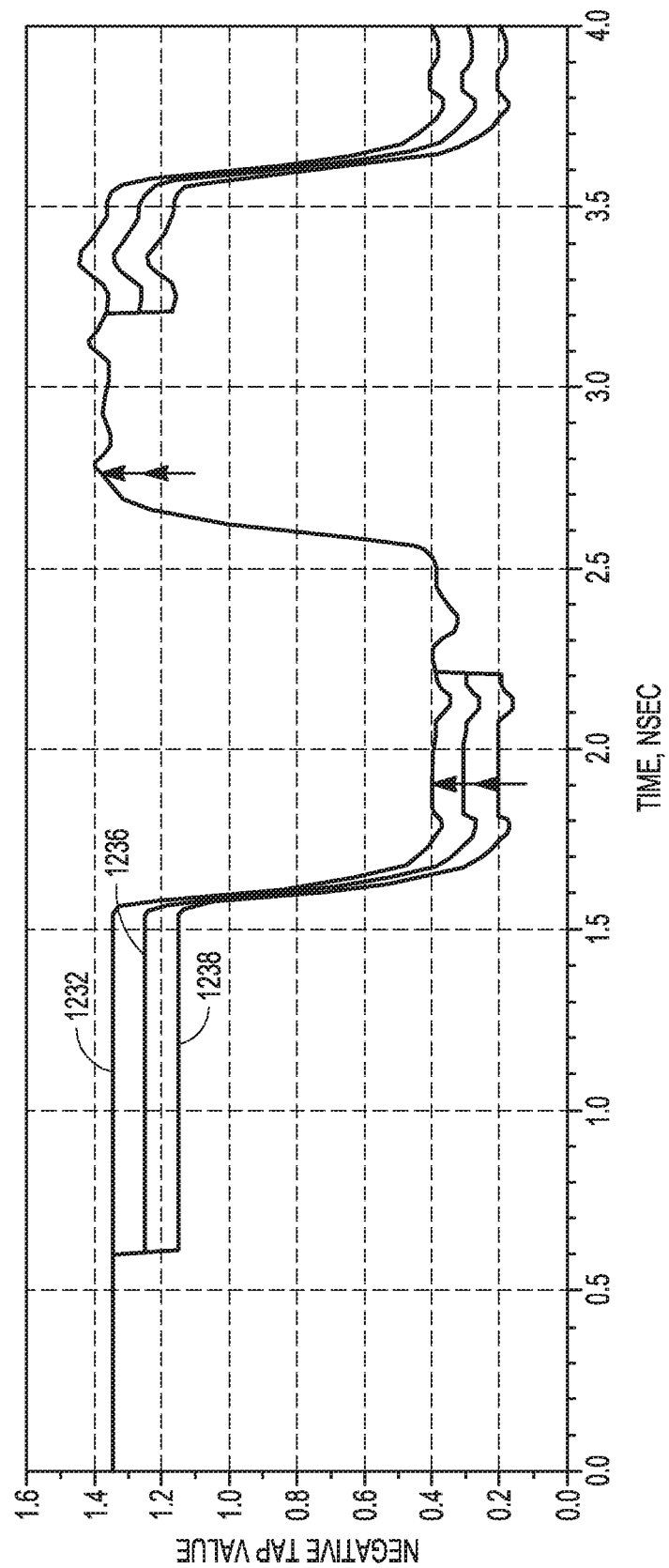
FIGS. 12A-12D illustrate a simulation of tap three of the four tap decision feedback equalizer of the data receiver associated with FIG. 5A for a negative tap value, according to various embodiments.
Figure 12D:
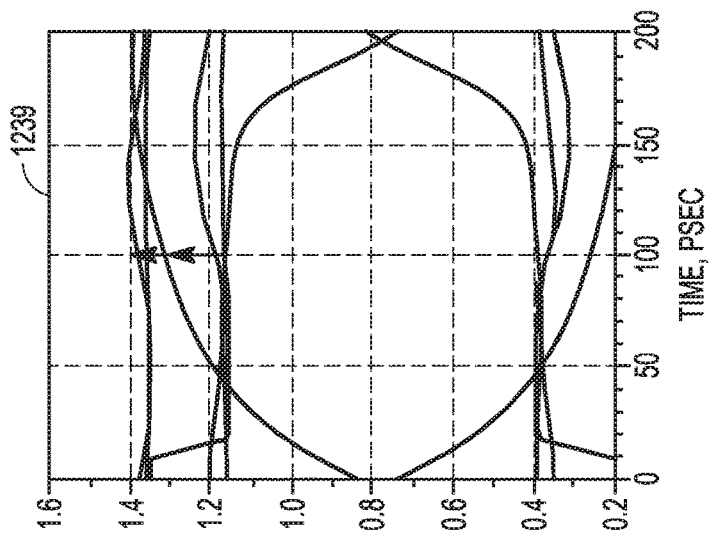
Figure 12C:
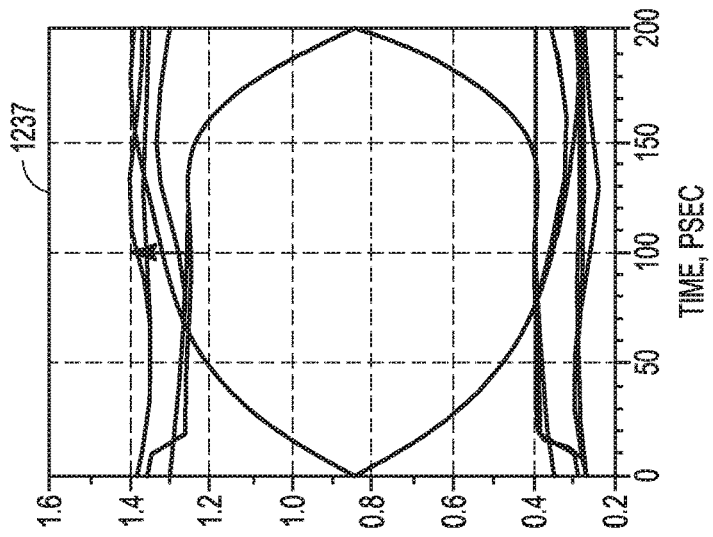
Figure 12B:
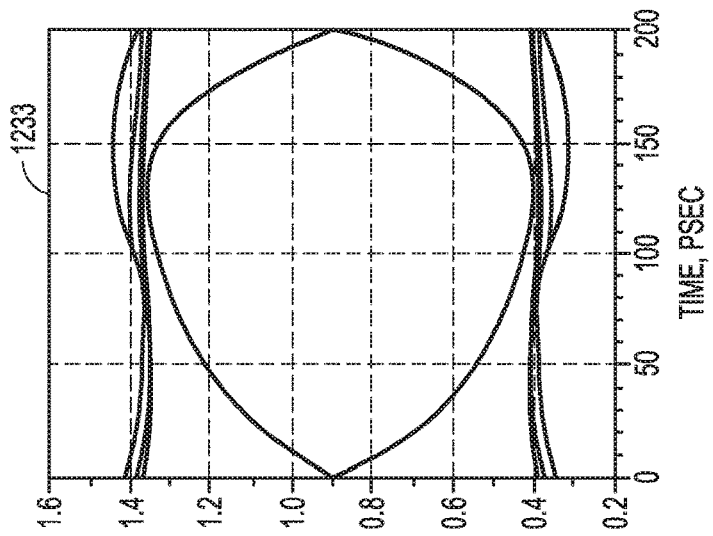

FIGS. 12A-12D illustrate a simulation of tap 3 of the four tap DFE of the data receiver associated with FIG. 8A for a negative tap value. Curves 1232, 1236, and 1238 of FIG. 12A are curves for a reference value, a first step value of tap 3, and a second step value of tap 3, respectively. Eye diagram 1233 of FIG. 12B corresponds to the reference value, eye diagram 1237 of FIG. 12C corresponds to the first step value of tap 3, and eye diagram 1239 of FIG. 12D corresponds to the second step value of tap 3.

Figure 13A:
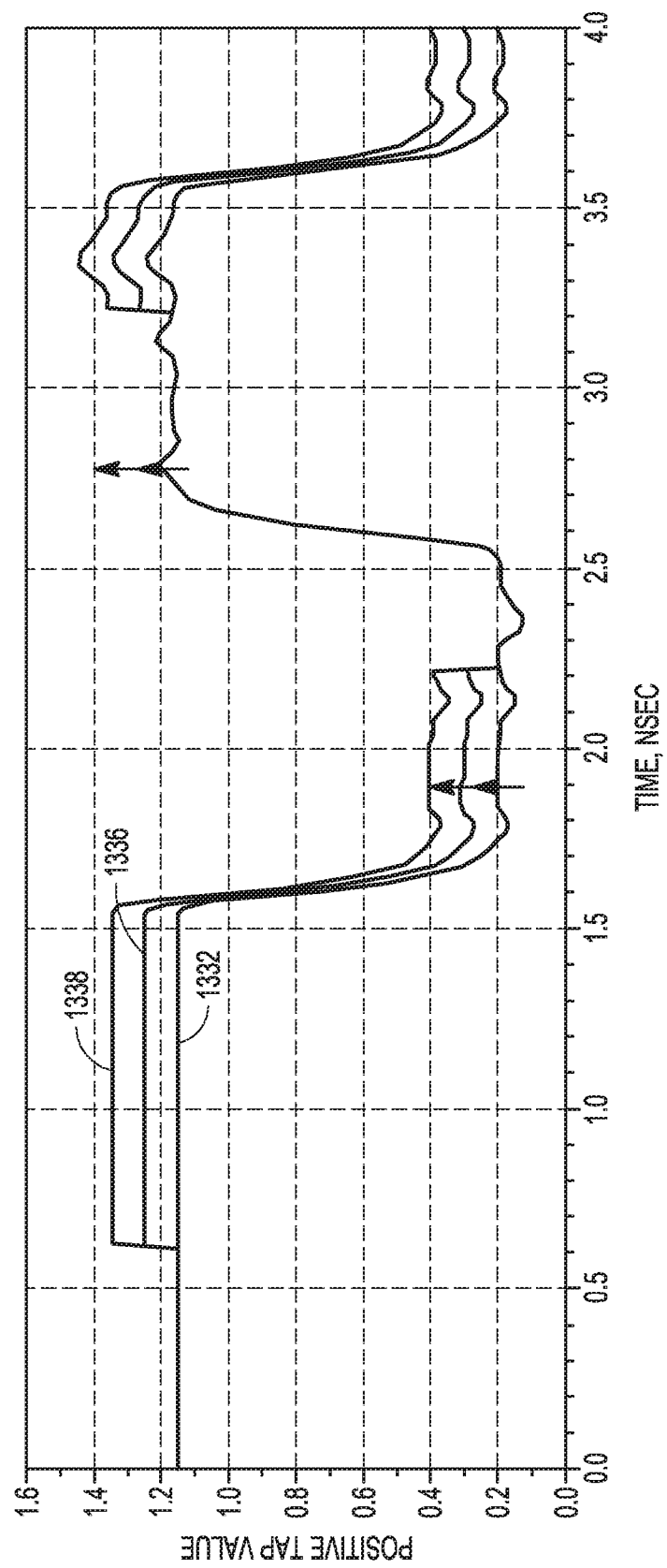
FIGS. 13A-13D illustrate a simulation of tap three of the four tap decision feedback equalizer of the data receiver associated with FIG. 8A for positive tap values, according to various embodiments.
Figure 13D:
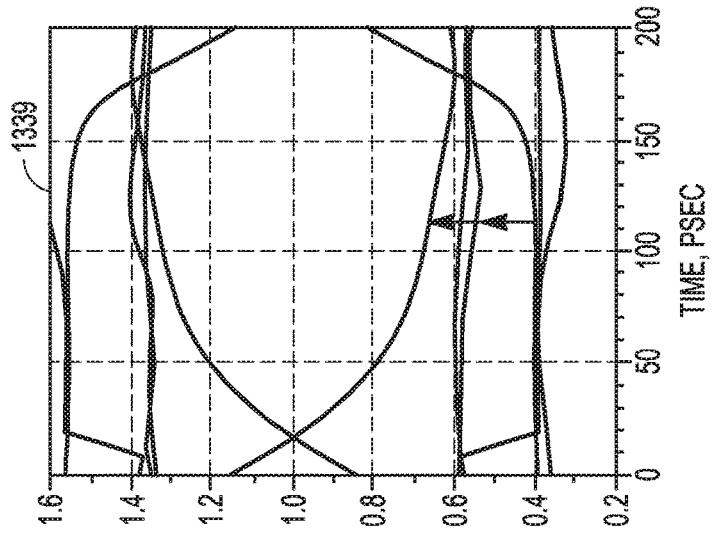
Figure 13C:
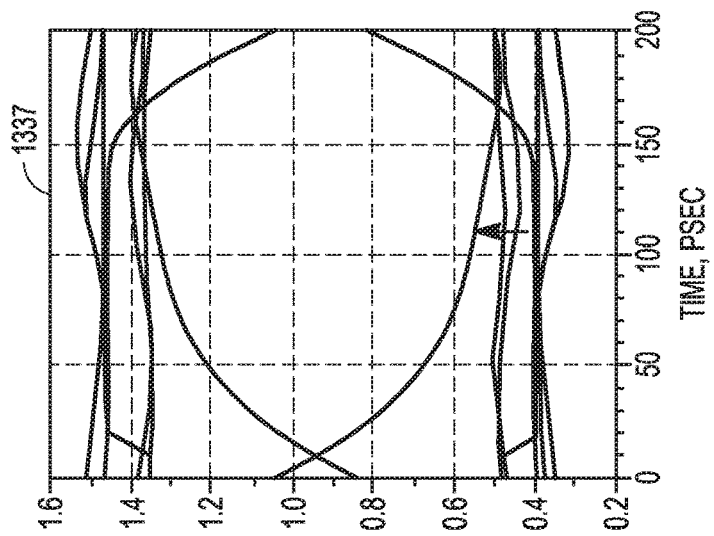
Figure 13B:
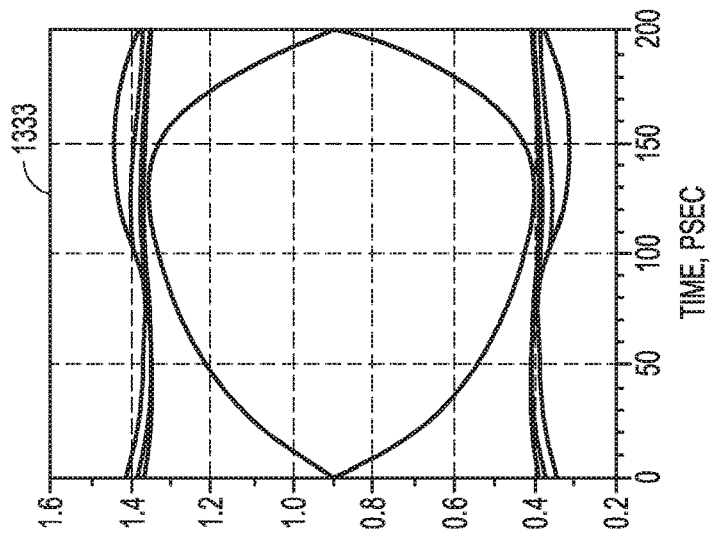

FIGS. 13A-13D illustrate a simulation of tap 3 of the four tap DFE of the data receiver associated with FIG. 8A for positive tap values. Curves 1332, 1336, and 1338 of FIG. 13A are curves for a reference value, a first step value of tap 3, and a second step value of tap 3, respectively. Eye diagram 1333 of FIG. 13B corresponds to the reference value, eye diagram 1337 of FIG. 13C corresponds to the first step value of tap 3, and eye diagram 1333 of FIG. 13D corresponds to the second step value of tap 3.

Figure 14A:
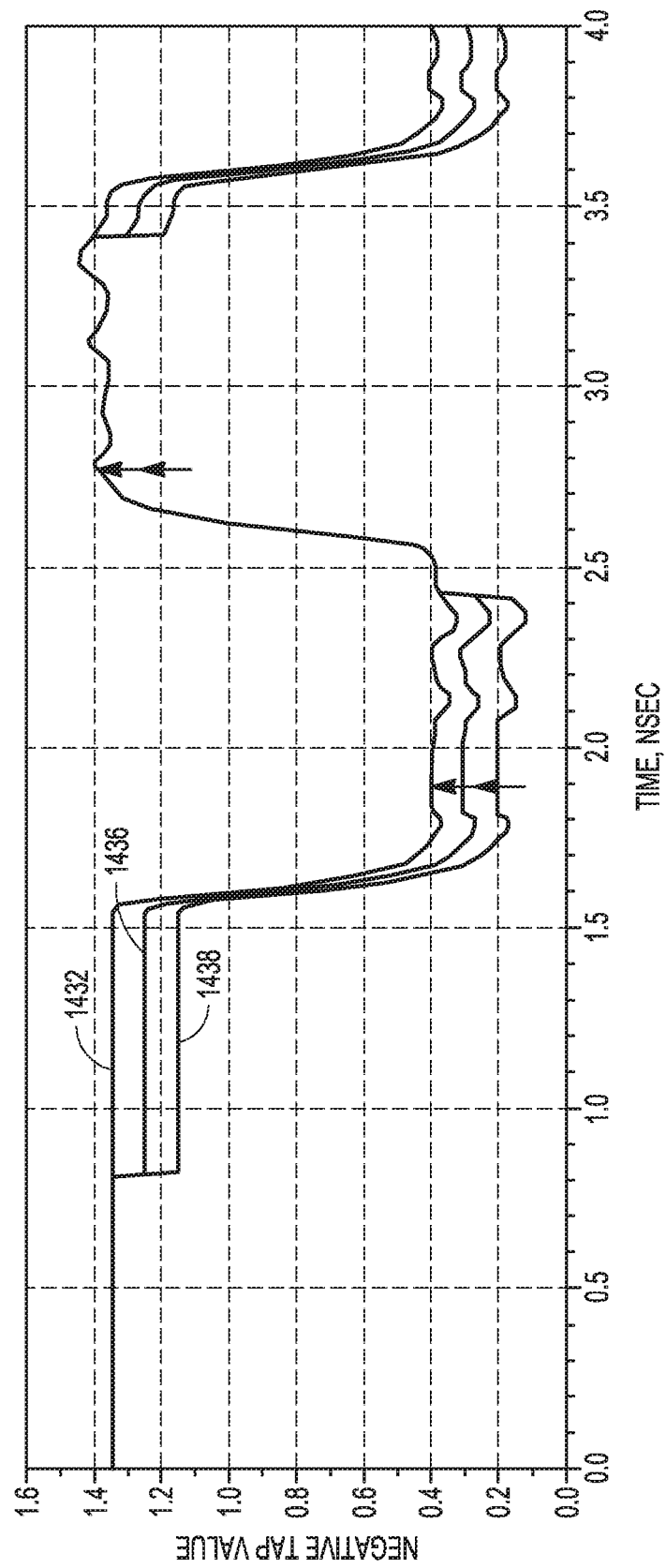
FIGS. 14A-14D illustrate a simulation of tap four of the four tap decision feedback equalizer of the data receiver associated with FIG. 8A for a negative tap value, according to various embodiments.
Figure 14D:
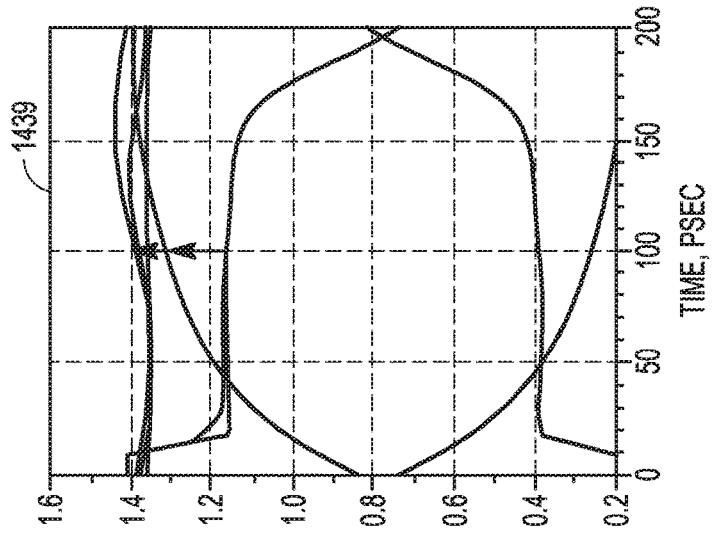
Figure 14C:
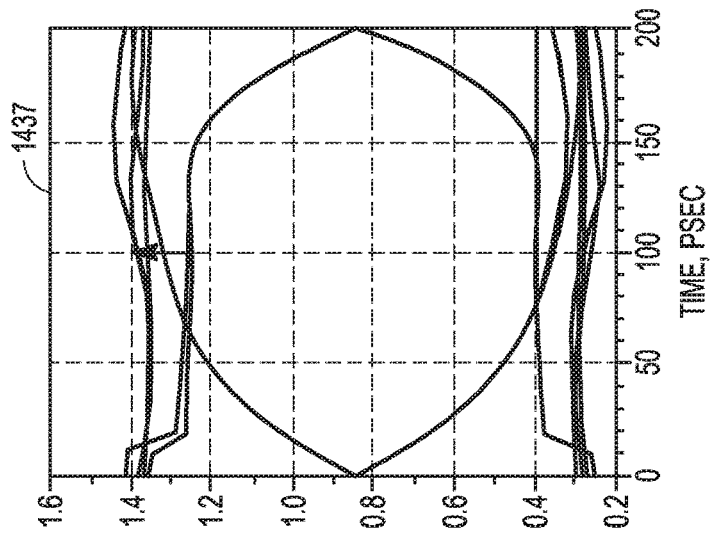
Figure 14B:
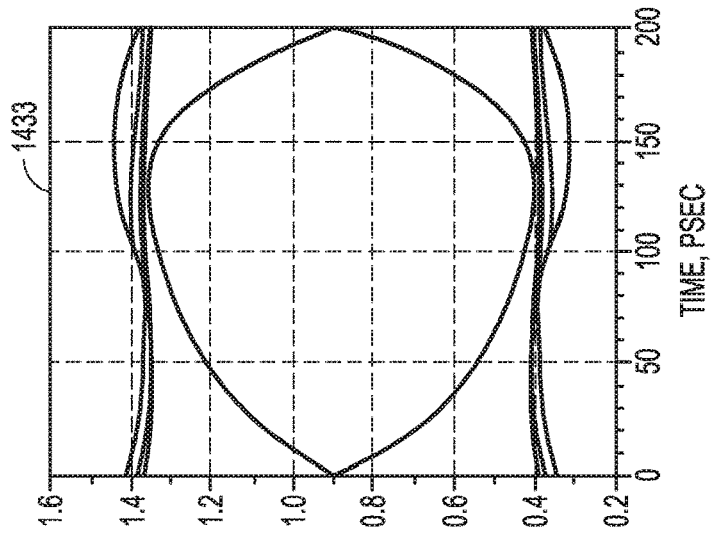

FIGS. 14A-14D illustrate a simulation of tap 4 of the four tap DFE of the data receiver associated with FIG. 8A for a negative tap value. Curves 1432, 1436, and 1438 of FIG. 14A are curves for a reference value, a first step value of tap 4, and a second step value of tap 4, respectively. Eye diagram 1433 of FIG. 14B corresponds to the reference value, eye diagram 1447 of FIG. 14C corresponds to the first step value of tap 4, and eye diagram 1439 of FIG. 14D corresponds to the second step value of tap 4.

Figure 15A:
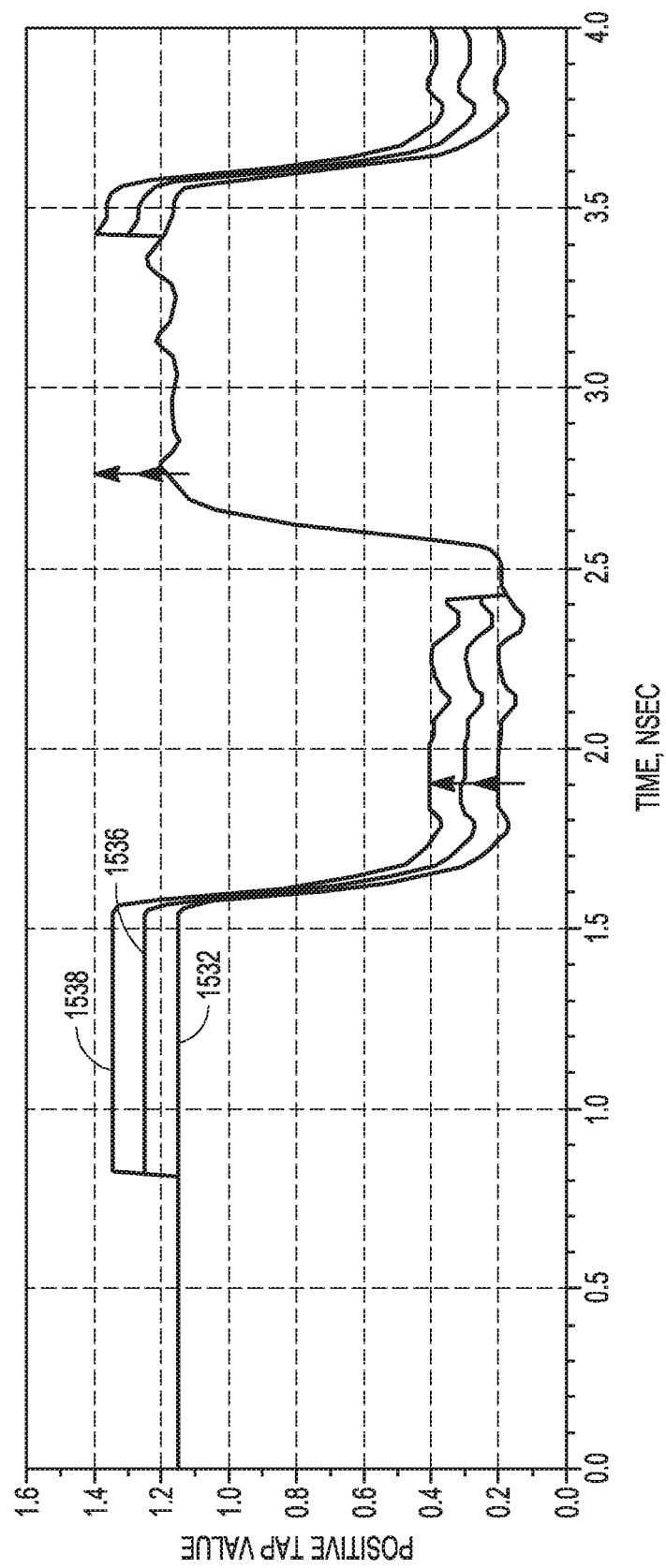
FIGS. 15A-15D illustrate a simulation of tap four of the four tap decision feedback equalizer of the data receiver associated with FIG. 8A for positive tap values, according to various embodiments.
Figure 15D:
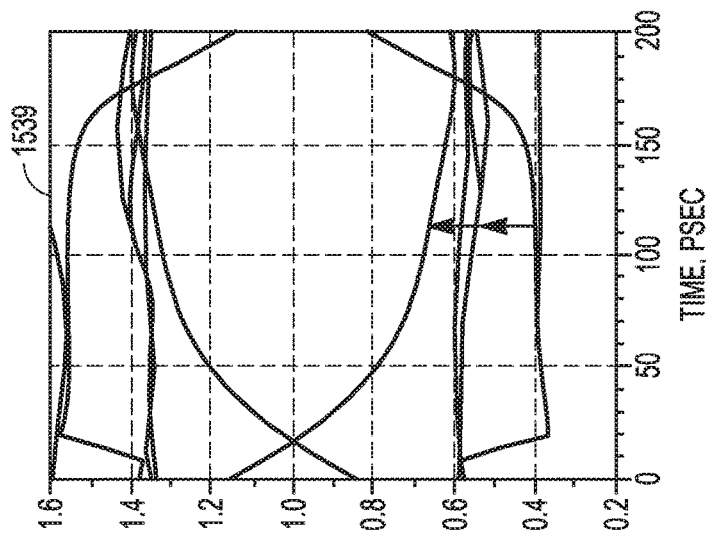
Figure 15C:
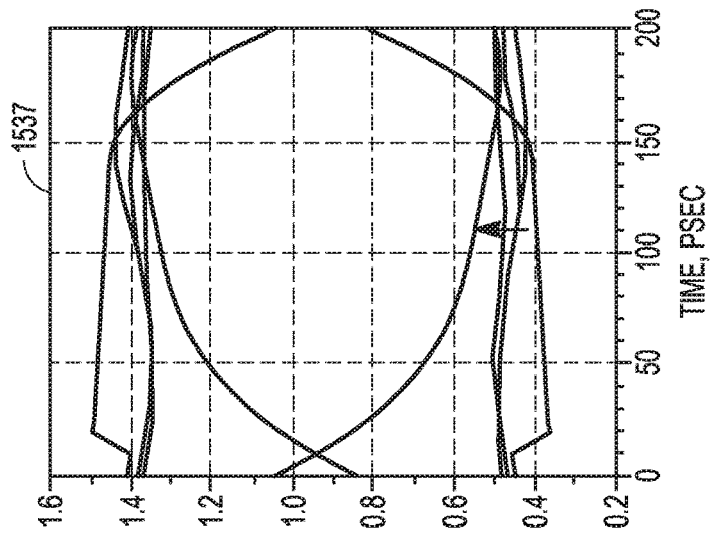
Figure 15B:
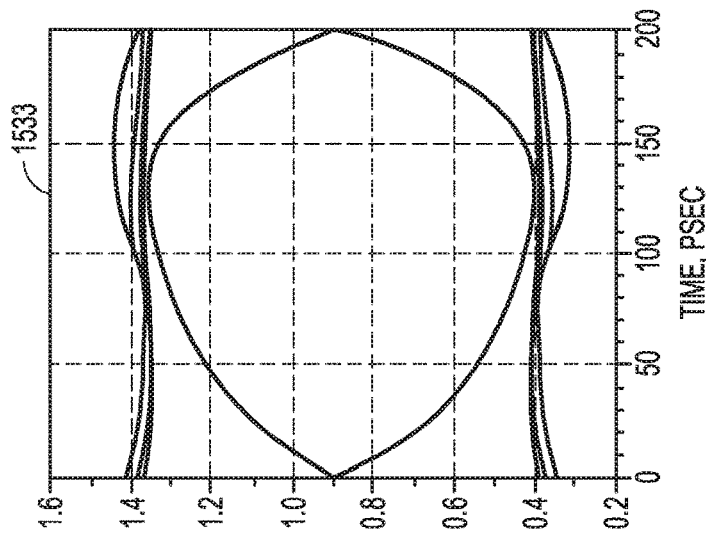

FIGS. 15A-15D illustrate a simulation of tap 4 of the four tap DFE of the data receiver associated with FIG. 8A for positive tap values. Curves 1532, 1536, and 1538 of FIG. 15A are curves for a reference value, a first step value of tap 4, and a second step value of tap 4, respectively. Eye diagram 1533 of FIG. 15B corresponds to the reference value, eye diagram 1537 of FIG. 15C corresponds to the first step value of tap 4, and eye diagram 1533 of FIG. 15D corresponds to the second step value of tap 4.

Figure 16A:
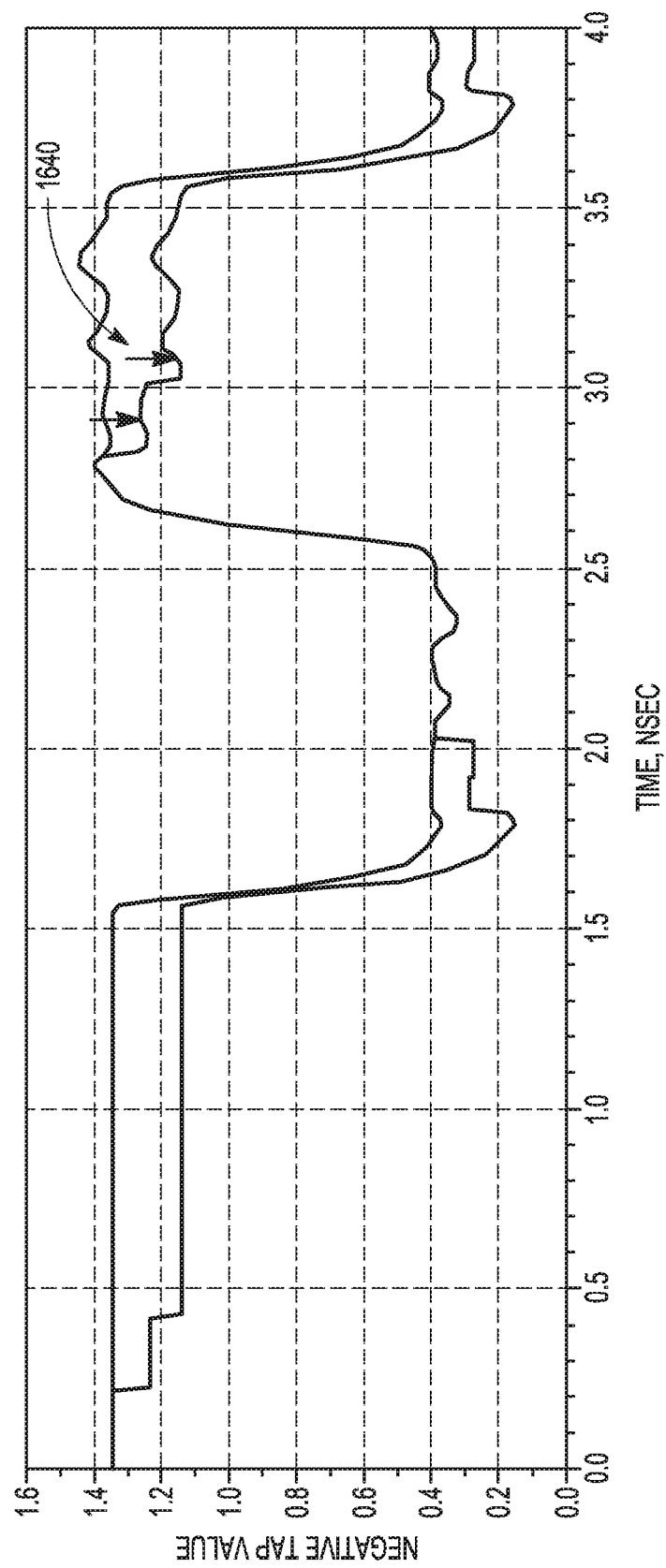
FIGS. 16A-16C illustrate a simulation of taps one and two of the four tap decision feedback equalizer of the data receiver associated with FIG. 8A for negative tap values, according to various embodiments.
Figure 16C:
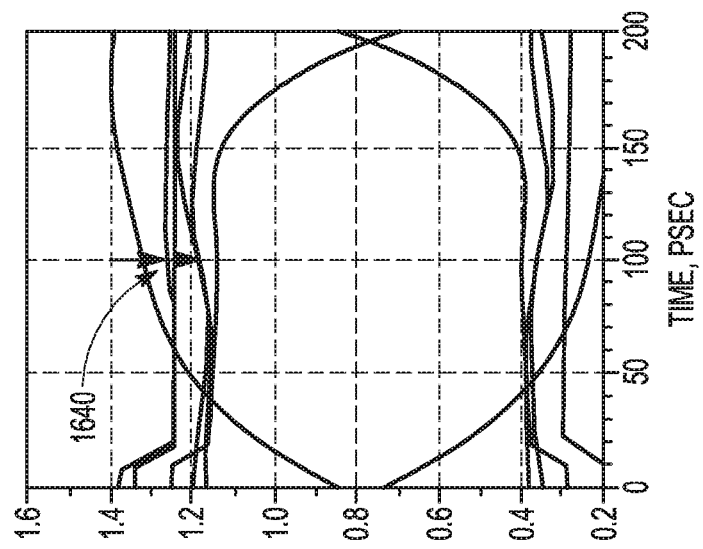
Figure 16B:
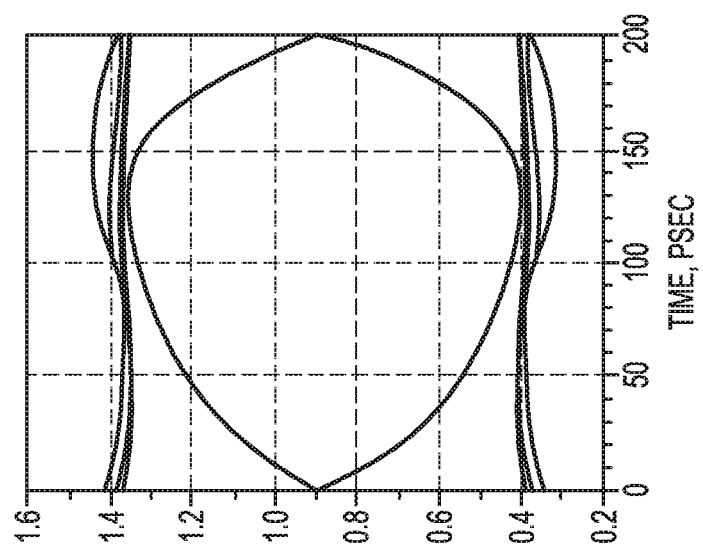

FIGS. 16A-16C illustrate a simulation of taps 1 and 2 of the four tap DFE of the data receiver associated with FIG. 8A for negative tap values. Taps 1 and 2 accumulate by the third UI. The arrows of FIG. 16A and FIG. 16C, indicated by 1640, are for tap 1 at −100 mV and tap 2 at −100 mV summed to −200 mV. This simulation indicates that measurements can be taken for combination of taps to study inter-tap dependencies. Eye closure remains linearly dependent on accumulated tap value.

Figure 17A:
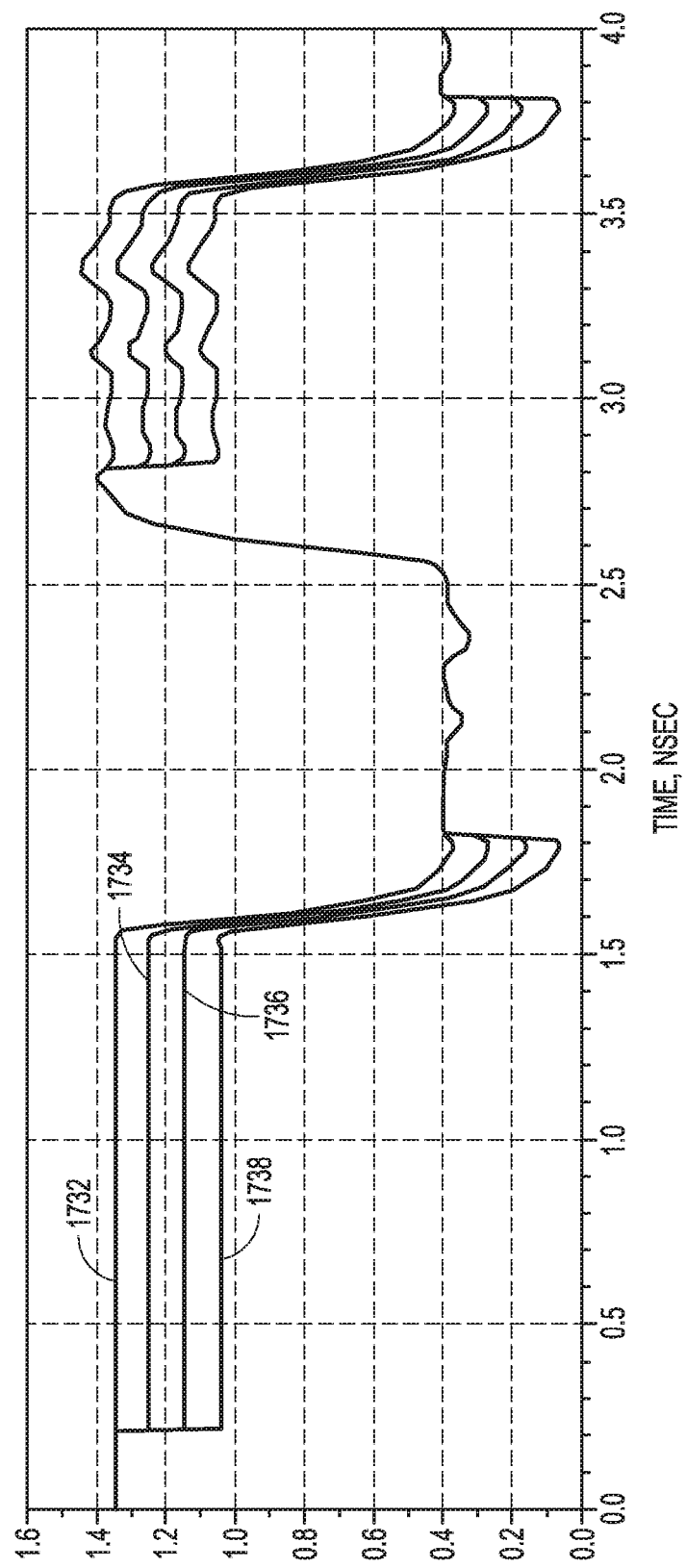
FIGS. 17A-17E illustrate a simulation of measuring a number of tap values of a decision feedback equalizer of a data receiver operating at 5 GB/s, according to various embodiments.
Figure 17B:
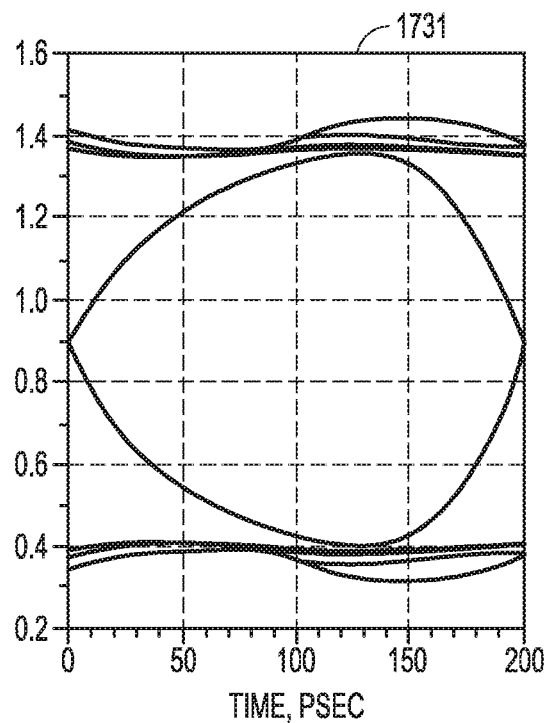
Figure 17C:
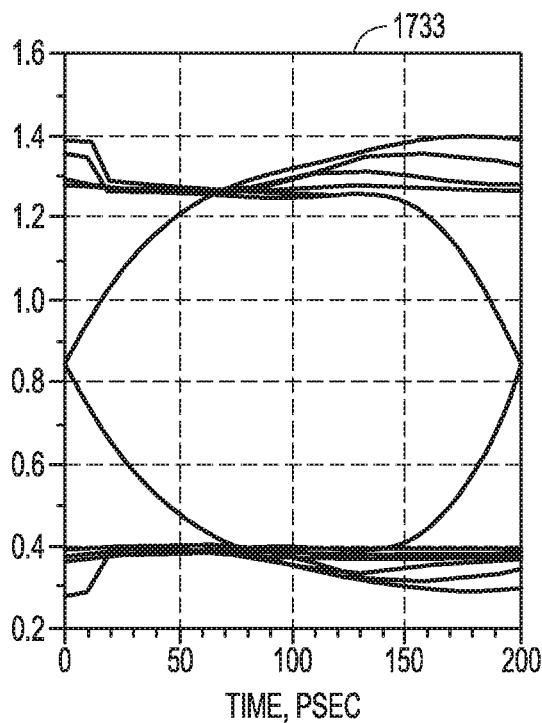
Figure 17D:
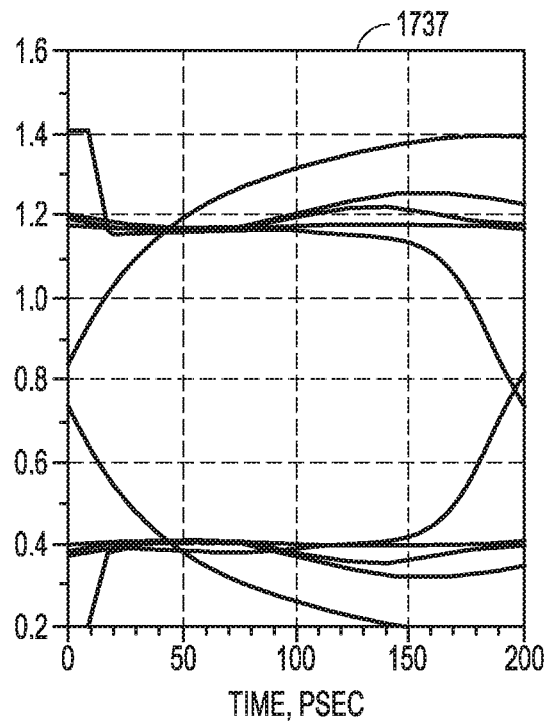
Figure 17E:
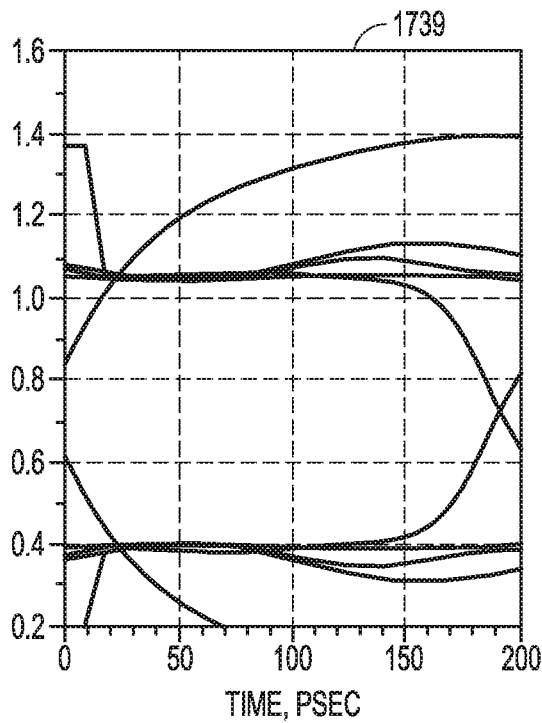

FIGS. 17A-17E illustrate a simulation of measuring a number of tap values of a DFE of a data receiver operating at 5 GB/s. Curves 1732, 1734, 1736, and 1738 of FIG. 17A are curves for a reference value, a first step value, a second step value, and a third set value, respectively. Eye diagram 1731 of FIG. 17B corresponds to the reference value, eye diagram 1733 of FIG. 17C corresponds to the first step value, eye diagram 1737 of FIG. 17D corresponds to the second step value, and eye diagram 1739 of FIG. 17E corresponds to the third step value.

Figure 18A:
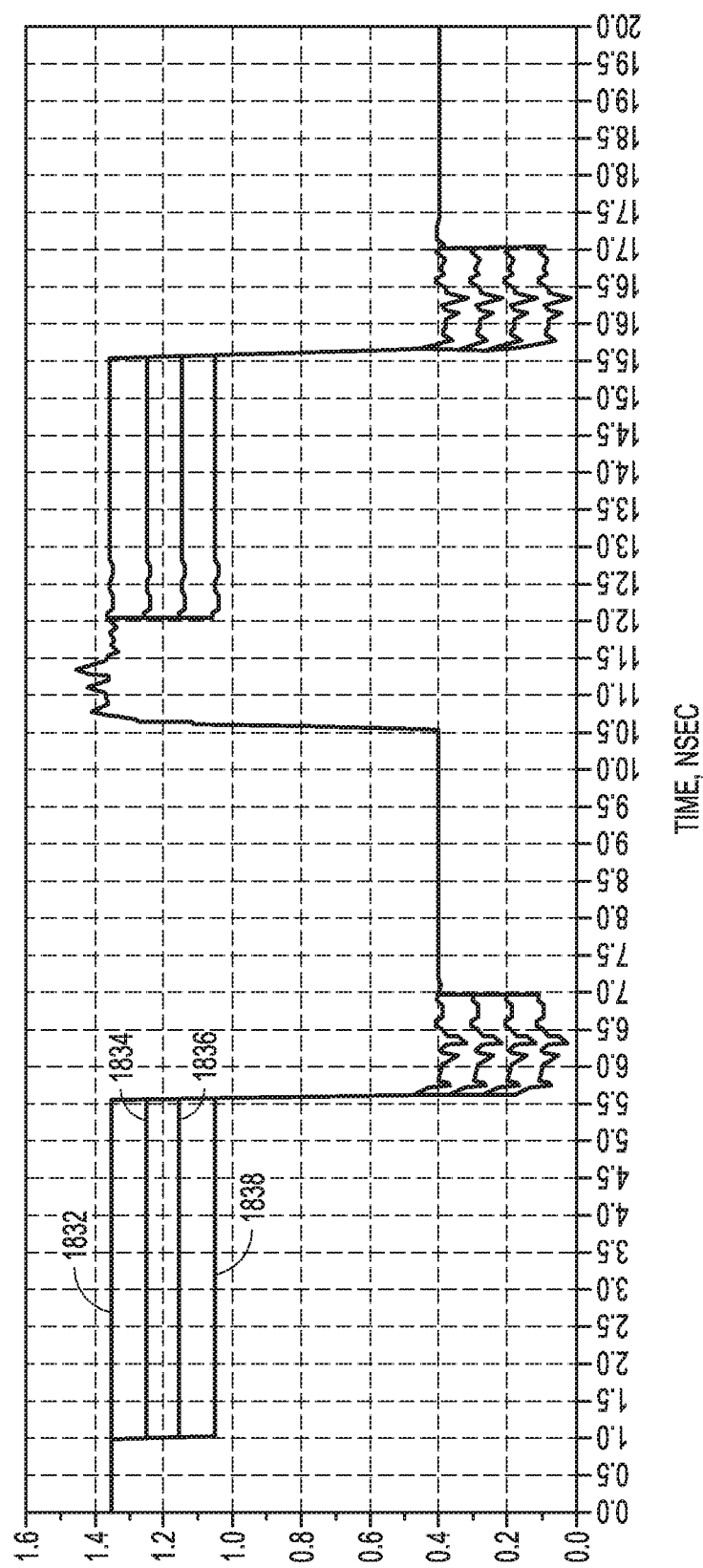
FIGS. 18A-18E illustrate a simulation of measuring a number of tap values of a decision feedback equalizer of a data receiver operating at 1 GB/s, according to various embodiments.
Figure 18B:
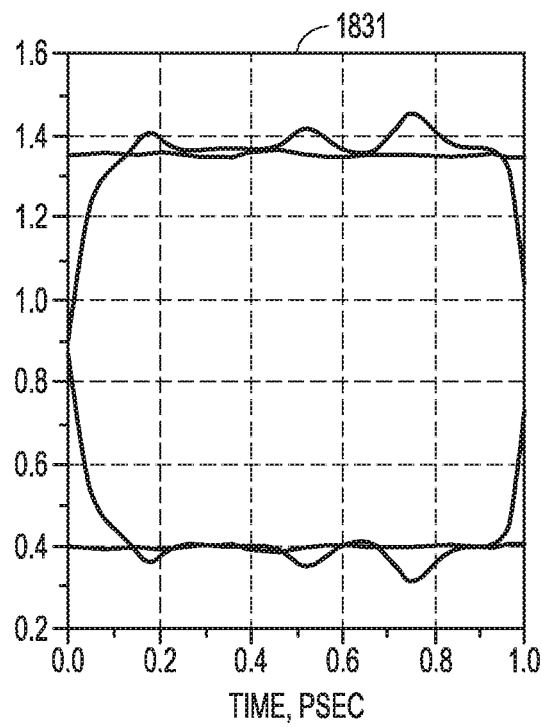
Figure 18C:
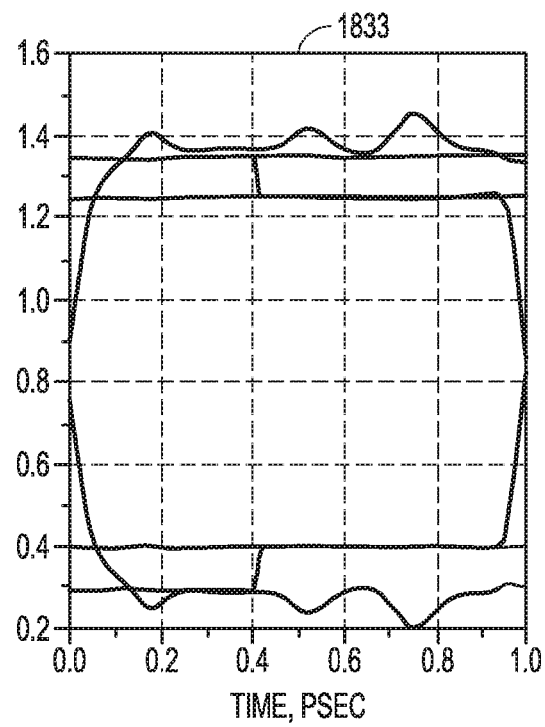
Figure 18D:
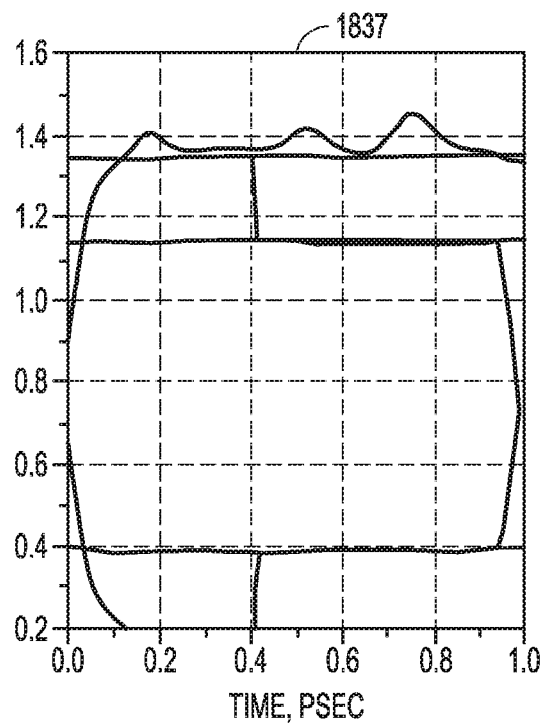
Figure 18E:
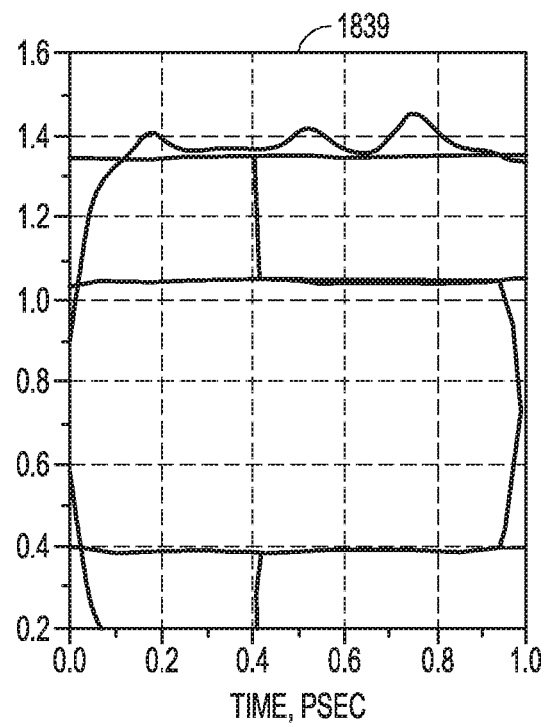

FIGS. 18A-18E illustrate a simulation of measuring a number of tap values of a DFE of a data receiver operating at 1 GB/s. Curves 1832, 1834, 1836, and 1838 of FIG. 18A are curves for a reference value, a first step value, a second step value, and a third set value, respectively. Eye diagram 1831 of FIG. 18B corresponds to the reference value, eye diagram 1833 of FIG. 18C corresponds to the first step value, eye diagram 1837 of FIG. 18D corresponds to the second step value, and eye diagram 1839 of FIG. 18E corresponds to the third step value. Comparing FIGS. 18A-18E with FIGS. 17A-17E demonstrates that the methods, as taught herein, can be run at slower speeds, that is, such methods can be run at rates different from running at the data rate of the data receiver in its implementation.

Figure 19:
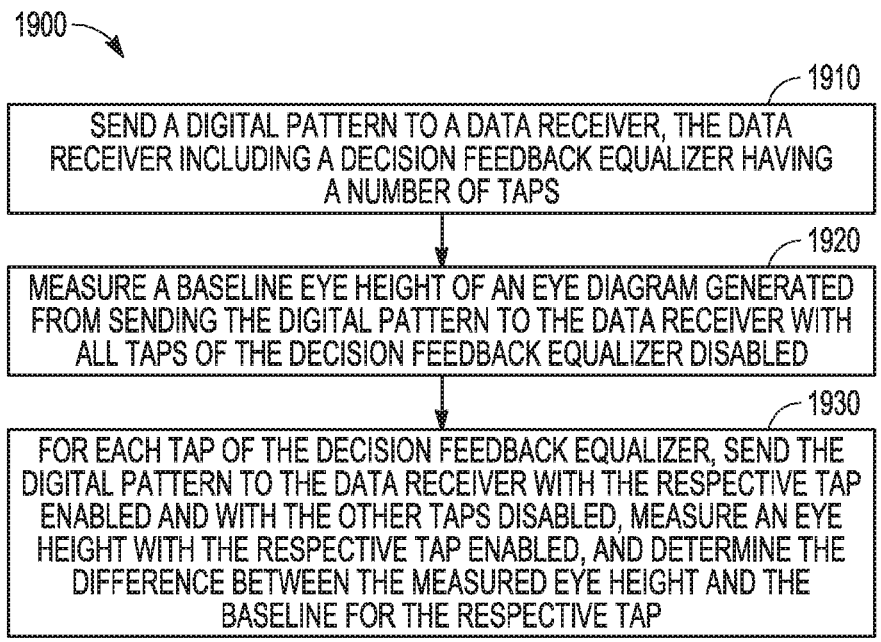
FIG. 19 is a flow diagram of features of an example method of characterizing taps of a decision feedback equalizer, according to various embodiments.

FIG. 19 is a flow diagram of features of an embodiment of an example method 1900 of conducting measurements with respect to taps of a decision feedback equalizer. At 1910, a digital pattern is sent to a data receiver, the data receiver including a decision feedback equalizer having a number of taps. The digital pattern can be maintained at a high value for a number of consecutive unit intervals greater than the number of taps and then at a low value at least one unit interval longer than the number of taps. At 1920, a baseline eye height of an eye diagram, generated from sending the digital pattern to the data receiver with all taps of the decision feedback equalizer disabled, is measured. At 1930, for each tap of the decision feedback equalizer, sending the digital pattern to the data receiver with the respective tap enabled and with the other taps disabled, measuring an eye height with the respective tap enabled, and determining the difference between the measured eye height and the baseline for the respective tap. The data receiver may be disposed in a communications device or other device that receives data. For example, the device in which the receiver receives data may be a device that receives data at different rates such as above 1 Gb/sec. The data receiver may be disposed in a memory device. Measuring the baseline eye height and measuring the eye height in a memory device can include using a loop back from the memory device.

Variations of method 1900 or methods similar to method 1900 can include a number of different embodiments that may or may not be combined depending on the application of such methods and/or the architecture of systems in which such methods are implemented. Such methods can include enabling the respective tap with a different value of the respective tap than a previous value with the other taps disabled, measuring an eye height with the respective tap enabled with the different value, and determining the difference between the measured eye height of the tap enabled with the different value and the measured eye height of the tap enabled with the previous value. Such methods can include determining tap step magnitude and linearity for each tap of the number of taps of the decision feedback equalizer based on the determined differences. Such methods can include iteratively enabling the respective tap with a different value such that the eye height reduces for each iteration until the eye height reduces toward zero to determine a range of the respective tap. In various embodiments, the number of taps of the decision feedback equalizer can equal, but is not limited to, four taps.

Figure 20:
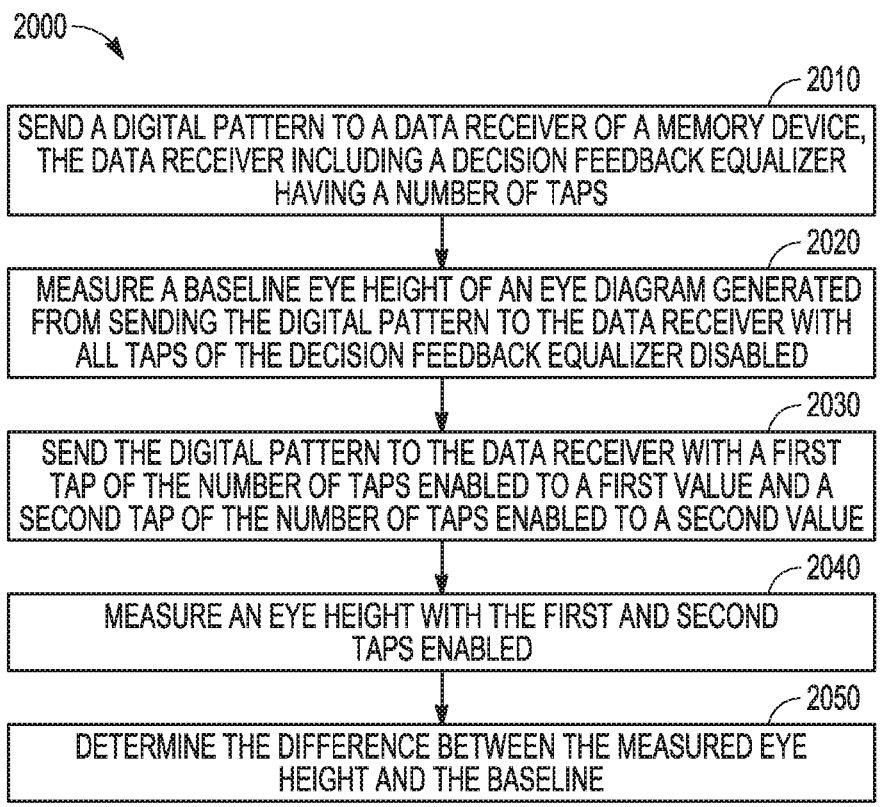
FIG. 20 is a flow diagram of features of an example method of characterizing taps of a decision feedback equalizer, according to various embodiments.

FIG. 20 is a flow diagram of features of an embodiment of an example method 2000 of conducting measurements with respect to taps of a decision feedback equalizer. At 2010, a digital pattern is sent to a data receiver of a memory device, the data receiver including a decision feedback equalizer having a number of taps. The digital pattern can be structured to maintain a high value for a number of consecutive unit intervals greater than the number of taps and then a low value at least one unit interval longer than the number of taps. At 2020, a baseline eye height of an eye diagram, generated from sending the digital pattern to the data receiver with all taps of the decision feedback equalizer disabled, can be measured.

At 2030, the digital pattern is sent to the data receiver with a first tap of the number of taps enabled to a first value and a second tap of the number of taps enabled to a second value. At 2040, an eye height is measured with the first and second taps enabled. At 2050, the difference between the measured eye height and the baseline is determined.

Variations of method 2000 or methods similar to method 2000 can include a number of different embodiments that may or may not be combined depending on the application of such methods and/or the architecture of systems in which such methods are implemented. Such methods can include changing at least one of the first value or the second value to a different value to newly enable the first and second taps; sending the digital pattern to the data receiver with the first and second taps newly enabled; measuring an eye height with the first and second taps newly enabled; and determining the difference between the measured eye height with the first and second taps newly enabled and the baseline. Such methods can include evaluating inter-tap dependencies between the first and second taps.

Variations of method 2000 or methods similar to method 2000 can include sending the digital pattern to the data receiver with selected taps of the other taps of the decision feedback equalizer, in addition to the first tap and the second tap, enabled with non-zero values; measuring an eye height with the selected taps, the first tap, and the second tap enabled; and determining the difference between the measured eye height and the baseline. The selected taps can be all of the other taps of the decision feedback equalizer, in addition to the first tap and the second tap.

Figure 21:
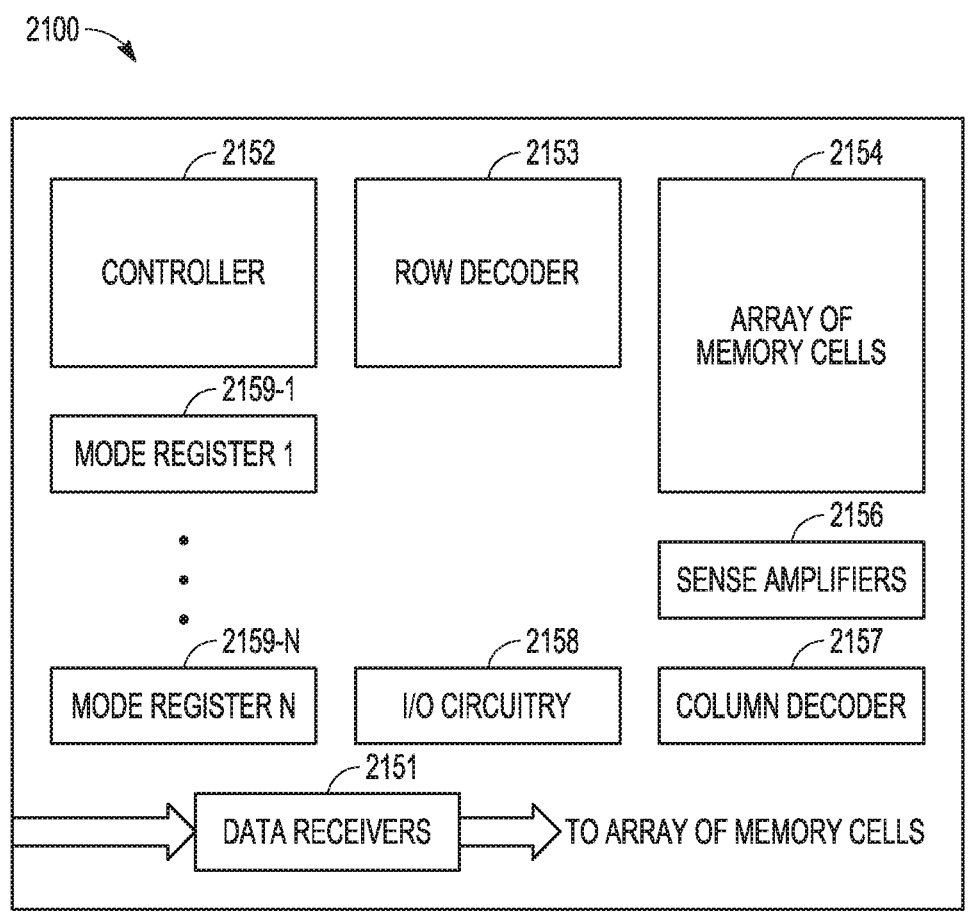
FIG. 21 is a block diagram of example components of an example memory device having data receivers that include decision feedback equalizers, according to various embodiments.

FIG. 21 is a block diagram of an embodiment of components of an example memory device 2100 having data receivers 2151 that include decision feedback equalizers. Memory device 2100 includes an array of memory cells that can store digital data. Each memory cell in memory array 2154 can store data with the memory cell placed in one of a number of programmed states. For example, a single-level cell (SLC) can represent one of two programmed states such as 1 or 0, representing one bit of data. Memory cells can also represent one of more than two programmed states, allowing the manufacture of higher density memories without increasing the number of memory cells, as each cell can represent more than one binary digit, that is, more than one bit. Such cells can be referred to as multi-state memory cells, multi-digit cells, or multi-level cells (MLCs). In certain examples, MLC can refer to a memory cell that can store two bits of data per cell, which can be in one of four programmed states. A triple-level cell (TLC) can refer to a memory cell that can store three bits of data per cell, which can be in one of eight programmed states, and a quad-level cell (QLC) can store four bits of data per cell, which can be in one of sixteen programmed states. MLC is used herein in its broader context, to can refer to any memory cell that can store more than one bit of data per cell, that is, can represent more than two programmed states.

Memory cells in array 2154 of memory cells can be accessed according to their address in array 2154, in which a row decoder 2153 and a column decoder 2157 can direct the access based on the address received by memory device 2100. In various architectures, sense amplifiers 2156 can be used to determine the digital bit or bits stored in an addressed memory cell via physical parameters such as voltage and current. The input and output of data from array 2154 of memory cells can be conducted using I/O circuitry 2158, where data access and components of memory cell 2100 under control of controller 2152. Controller 2152 can also control data receivers 2151 that receive data for array 2154 from data input lines 2158 and can provide the received data to a path to the array 2154. Each data receiver of the data receivers 2151 can include a decision feedback equalizer having a number of taps for the respective data receiver, as taught herein. Characterization of the taps for a respective data receiver can be conducted using I/O circuitry 2158, for example under control of controller 2152, to provide signals at the output of the decision feedback equalizer in response to interrogating signals input to the respective data receiver. These signals may be looped back from memory device 2100 to an external analyzer that enables evaluation of these signals.

A set of mode registers 2159-1 . . . 2159-N can be communicatively coupled to controller 2152. The set of mode registers 2159-1 . . . 2159-N can include one or more mode registers programmable with respect to values of the taps of a selected data receiver in measurements to characterize the taps of the decision feedback equalizer of the selected data receiver. The memory one or more mode registers are programmable to selectively enable the taps of the decision feedback equalizer of the selected data receiver in accordance with measurement algorithms. The set of mode registers 2159-1 . . . 2159-N are programmable to enable one of the taps of the decision feedback equalizer of the selected data receiver, while disabling the other taps and to increment values of the enabled tap during different periods of receiving a data pattern to the selected data receiver. The set of mode registers 2159-1 . . . 2159-N can include one of more registers operable to store operational values of each tap of the number of taps for each data receiver. At least one of the decision feedback equalizers can have a set of operational values of its taps different from a set of operational values of taps of another decision feedback equalizer.

Figure 22:
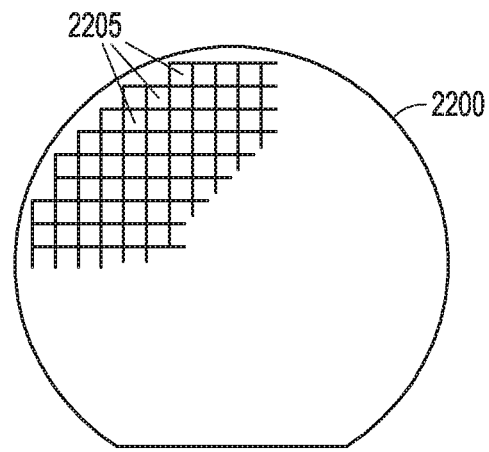
FIG. 22 illustrates an example of a wafer arranged to provide multiple electronic components, according to various embodiments.

FIG. 22 illustrates an embodiment of an example of a wafer 2200 arranged to provide multiple electronic components. Wafer 2200 can be provided as a wafer in which a number of dice 2205 can be fabricated. Alternatively, wafer 2200 can be provided as a wafer in which the number of dice 2205 have been processed to provide electronic functionality and are awaiting singulation from wafer 2200 for packaging. Wafer 2200 can be provided as a semiconductor wafer, a semiconductor on insulator wafer, or other appropriate wafer for processing electronic devices such as an integrated circuit chips.

Using various masking and processing techniques, each die 2205 can be processed to include functional circuitry such that each die 2205 is fabricated as an integrated circuit with the same functionality and packaged structure as the other dice on wafer 2200. Alternatively, using various masking and processing techniques, various sets of dice 2205 can be processed to include functional circuitry such that not all of the dice 2205 are fabricated as an integrated circuit with the same functionality and packaged structure as the other dice on wafer 2200. A packaged die having circuits integrated thereon providing electronic capabilities is herein referred to as an integrated circuit (IC).

Wafer 2200 can comprise multiple dice 2205. Each die 2205 of the multiple dice can be structured as an integrated circuit having a decision feedback equalizer having a number of taps for the respective data receiver, where characteristics of the taps can be measured, as taught herein.

Figure 23:
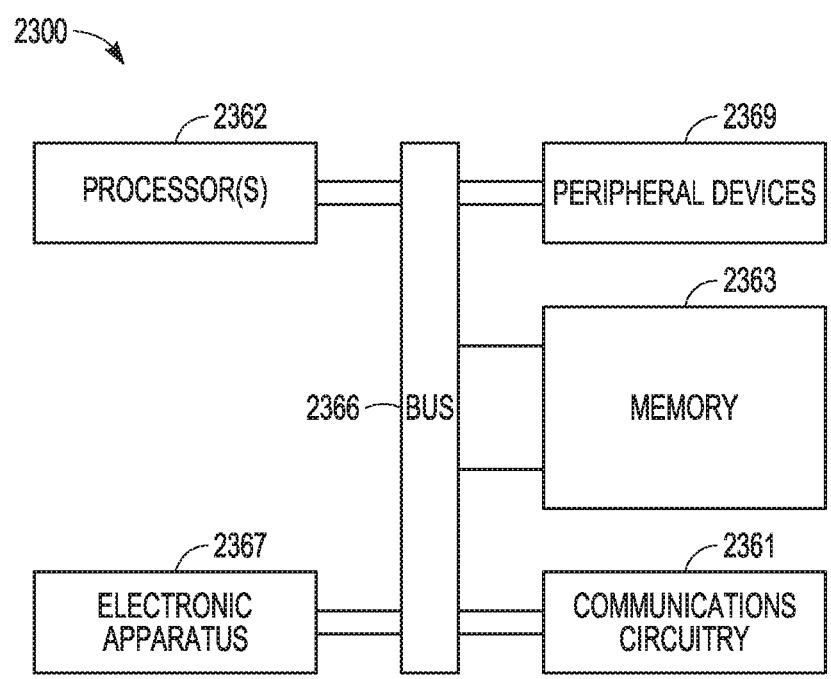
FIG. 23 is a block diagram of an example system that includes one or more data receivers having a decision feedback equalizer having a number of taps for the respective data receiver, where characteristics of the taps can be measured, according to various embodiments.

FIG. 23 is a block diagram of an embodiment of an example system 2300 that includes one or more data receivers having a decision feedback equalizer having a number of taps for the respective data receiver, where characteristics of the taps can be measured, as taught herein. System 2300 can include one or more processors 2362 operatively coupled to memory 2363. System 2300 can also include communications circuitry 2361, an electronic apparatus 2367, and peripheral devices 2369. One or more processors 2362, communications circuitry 2361, memory 2363, electronic apparatus 2367, or peripheral devices 2369 can be in the form of one or more ICs and may include a data receiver having a decision feedback equalizer having a number of taps for the respective data receiver, where characteristics of the taps can be measured. Each tap can have a number of different values. Such characteristics can include tap step size of each tap, the linearity of the steps of each tap, and the range of each tap.

A bus 2366 provides electrical conductivity between and/or among various components of system 2300. In an embodiment, bus 2366 can include an address bus, a data bus, and a control bus, each independently configured. In an alternative embodiment, bus 2366 can use common conductive lines for providing one or more of address, data, or control, the use of which is regulated by one or more processors 2362. Bus 2366 may be part of a network with communications controlled by one or more processors 2362 and/or communications circuitry 2361.

Electronic apparatus 2367 may include additional memory. Memory in system 2300 may be constructed as one or more types of memory such as, but not limited to, dynamic random access memory (DRAM), static random access memory (SRAM), synchronous dynamic random access memory (SDRAM), synchronous graphics random access memory (SCRAM), double data rate dynamic rain (DDR), double data rate SDRAM, and magnetic based memory.

Peripheral devices 2369 may include displays, imaging devices, printing devices, wireless devices, additional storage memory, and control devices that may operate in conjunction with one or more processors 2362. In various embodiments, system 2300 includes, but is not limited to, fiber optic systems or devices, electro-optic systems or devices, optical systems or devices, imaging systems or devices, and information handling systems or devices such as wireless systems or devices, telecommunication systems or devices, and computers.

In various embodiments, techniques to characterize taps of a decision feedback equalizer of a data receiver and associated structure to conduct such techniques can be realized in a relatively simple manner. These techniques can avoid use of a golden channel created to produce known inter-symbol interference. In addition, such techniques can avoid employing a variety of input data patterns to exercise and isolate each tap of the decision feedback equalizer. These techniques enable independent and complete characterization of taps of the of the decision feedback equalizer including, but not limited to, step size, linearity, and range. The decision feedback equalizer can have a number of taps, 1-N, which can be independently and completely characterized. For example, such a decision feedback equalizer may have tour taps that can be characterized as 1-4 separate taps. In addition, these techniques enable selected combination of tap values to study inter-tap dependencies of the decision feedback equalizer. Further, these techniques can be conducted without running at full speed of the data receiver.

Although specific embodiments have been illustrated and described herein, it will be appreciated by those of ordinary skill in the art that other arrangements derived from the teachings herein may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. An apparatus comprising:
   a plurality of data receivers configured to receive data and provide the received data, each data receiver of the plurality of data receivers including a decision feedback equalizer having a plurality of taps for the respective data receiver; and
   a set of mode registers including one or more mode registers configured to be programmable with respect to values of the taps of the decision feedback equalizer of a selected data receiver in measurements to characterize the taps of the decision feedback equalizer of the selected data receiver.

2. The apparatus of claim 1, wherein the one or more mode registers are programmable to selectively enable the taps of the decision feedback equalizer of the selected data receiver.

3. The apparatus of claim 1, wherein the one or more mode registers are programmable to enable one of the taps of the decision feedback equalizer of the selected data receiver while disabling the other taps and to increment values of the enabled tap during different periods of receiving a data pattern to the selected data receiver.

4. The apparatus of claim 1, wherein the set of mode registers includes one of more registers operable to store operational values of each tap of the plurality of taps for each data receiver.

5. The apparatus of claim 4, wherein the decision feedback equalizer of at least one of the plurality of data receivers has a set of operational values of its taps different from a set of operational values of taps of the decision feedback equalizer of another one of the plurality of data receivers.

6. The apparatus of claim 1, further comprising an array of memory cells;
wherein the plurality of data receivers is configured to provide the received data to a path to the array.

7. The apparatus of claim 6, wherein each memory cell of the memory cells is configured as a single-level cell to store one bit.

8. The apparatus of claim 6, wherein each memory cell of the memory cells is configured as a multi-level cell to store two bits.

9. The apparatus of claim 6, wherein each memory cell of the memory cells is configured as a triple-level cell to store three bits.

10. The apparatus of claim 6, wherein each memory cell of the memory cells is configured as a quad-level cell to store four bits.

11. A method comprising:
receiving data at a plurality of data receivers, each data receiver of the plurality of data receivers including a decision feedback equalizer having a plurality of taps for respective data receiver; and
programming one or more mode registers of a set of mode registers with respect to values of the taps of the decision feedback equalizer of a selected data receiver in measurements to characterize the taps of the decision feedback equalizer of the selected data receiver.

12. The method of claim 11, wherein the programming the one or more mode registers comprises selectively enabling the taps of the decision feedback equalizer of the selected data receiver.

13. The method of claim 11, wherein the programming the one or more mode registers comprises enabling one of the taps of the decision feedback equalizer of the selected data receiver while disabling the other taps and incrementing values of the enabled tap during different periods of receiving a data pattern to the selected data receiver.

14. The method of claim 11, wherein the programming the one or more mode registers comprises storing operational values of each tap of the plurality of taps for each data receiver.

15. The method of claim 14, wherein the storing the operational values causes the decision feedback equalizer of at least one of the plurality of data receivers to have a set of operational values of its taps different from a set of operational values of taps of the decision feedback equalizer of another one of the plurality of data receivers.

16. An apparatus comprising:
an array of memory cells;
a plurality of data input lines;
a plurality of data receivers configured to receive data from the plurality of data input lines, the plurality of data receivers further configured to provide the received data to a path to the array, each data receiver of the plurality of data receivers comprising a decision feedback equalizer having a plurality of taps; and
a set of mode registers, the set of mode registers including one or more mode registers configured to be programmable with respect to values of the taps of a selected data receiver in measurements to characterize the taps of the decision feedback equalizer of the selected data receiver.

17. The apparatus of claim 16, wherein the one or more mode registers are programmable to selectively enable the taps of the decision feedback equalizer of the selected data receiver.

18. The apparatus of claim 16, wherein the one or more mode registers are programmable to enable one of the taps of the decision feedback equalizer of the selected data receiver while disabling the other taps and to increment values of the enabled tap during different periods of receiving a data pattern to the selected data receiver.

19. The apparatus of claim of claim 16, wherein the set of mode registers includes one of more registers operable to store operational values of each tap of the number of taps for each data receiver.

20. The apparatus of claim of claim 19, wherein at least one of the decision feedback equalizers has a set of operational values of its taps different from a set of operational values of taps of another decision feedback equalizer.

* * * * *